United States Patent
Kamel

(10) Patent No.: US 8,493,214 B2
(45) Date of Patent: *Jul. 23, 2013

(54) METHOD AND APPARATUS FOR WIRELESS MANAGEMENT OF ARTICLES

(75) Inventor: John-Pierre Kamel, Toronto (CA)

(73) Assignee: BCE Inc., Verdun (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/476,112

(22) Filed: May 21, 2012

(65) Prior Publication Data

US 2012/0299704 A1  Nov. 29, 2012

Related U.S. Application Data

(63) Continuation of application No. 11/965,267, filed on Dec. 27, 2007, now Pat. No. 8,184,005.

(30) Foreign Application Priority Data

Dec. 29, 2006  (CA) ...................................... 2572649

(51) Int. Cl.
*G08B 13/14* (2006.01)
(52) U.S. Cl.
USPC ................... 340/572.1; 340/10.1; 340/10.32; 340/5.92
(58) Field of Classification Search
USPC .............. 340/572.1, 10.1, 10.51, 10.32, 10.4, 340/10.5, 592, 6.1, 8.1
See application file for complete search history.

(56) References Cited

U.S. PATENT DOCUMENTS

| | | | |
|---|---|---|---|
| 5,565,858 A | 10/1996 | Guthrie |
| 5,856,788 A | 1/1999 | Walter et al. |
| 6,286,762 B1 | 9/2001 | Reynolds et al. |
| 6,496,806 B1 | 12/2002 | Horwitz et al. |
| 6,943,678 B2 | 9/2005 | Muirhead |
| 6,972,682 B2 | 12/2005 | Lareau et al. |
| 7,212,121 B2 | 5/2007 | Hashimoto et al. |
| 7,319,393 B2 | 1/2008 | Forster |
| 7,342,496 B2 | 3/2008 | Muirhead |
| 7,348,886 B2 | 3/2008 | Himberger et al. |
| 7,501,952 B2 | 3/2009 | Forster |
| 7,504,949 B1 | 3/2009 | Rouaix et al. |
| 7,522,568 B2 | 4/2009 | Twitchel |
| 7,789,024 B2 | 9/2010 | Muirhead |
| 7,948,371 B2 | 5/2011 | Muirhead |

(Continued)

FOREIGN PATENT DOCUMENTS

WO  WO-2006002280 A1  1/2006

*Primary Examiner* — Toan N Pham
(74) *Attorney, Agent, or Firm* — Murray IP Consulting Inc.; Sean Murray

(57) ABSTRACT

The present invention is directed to method and apparatus for wireless management of articles. The method is implemented by a master RFID tag. The method includes transmitting at least one first RFID read signal to a plurality of RFID tags local to the master RFID tag and receiving a first RFID response signal from each of the plurality of RFID tags in response to the at least one first RFID read signal. Each of the first RFID response signals comprises an identifier associated with an article. The method further includes maintaining an article record indicating at least one expected article that is to be managed by the master RFID tag and comparing each of the identifiers with the article record in an attempt to compile contextual information associated with the article record. The method further includes transmitting a master signal comprising the contextual information associated with the article record.

20 Claims, 15 Drawing Sheets

U.S. PATENT DOCUMENTS

| | | |
|---|---|---|
| 8,253,565 B2 * | 8/2012 | Trosper .......................... 340/571 |
| 8,269,605 B2 * | 9/2012 | Moore ........................... 340/8.1 |
| 2002/0030597 A1 | 3/2002 | Muirhead |
| 2002/0040928 A1 | 4/2002 | Jalili et al. |
| 2004/0223481 A1 | 11/2004 | Juels et al. |
| 2005/0134436 A1 | 6/2005 | Brookner |
| 2005/0237184 A1 | 10/2005 | Muirhead |
| 2005/0241548 A1 | 11/2005 | Muirhead |
| 2006/0243174 A1 | 11/2006 | Muirhead |
| 2007/0137531 A1 | 6/2007 | Muirhead |
| 2007/0163472 A1 | 7/2007 | Muirhead |
| 2007/0171080 A1 | 7/2007 | Muirhead |
| 2008/0066658 A1 | 3/2008 | Muirhead |
| 2008/0121339 A1 | 5/2008 | Muirhead |
| 2008/0122610 A1 | 5/2008 | Muirhead |
| 2008/0231426 A1 | 9/2008 | Kamel |
| 2008/0231451 A1 | 9/2008 | Kamel |
| 2011/0068924 A1 | 3/2011 | Muirhead |
| 2011/0227725 A1 | 9/2011 | Muirhead |

* cited by examiner

METHOD AND APPARATUS FOR WIRELESS MANAGEMENT OF ARTICLES

RELATED APPLICATIONS

This Application is a Continuation of U.S. patent application Ser. No. 11/965,267, filed on Dec. 27, 2007, and entitled "METHOD AND APPARATUS FOR WIRELESS MANAGEMENT OF ARTICLES" which claims the benefit under 35 U.S.C. §119(a) to Canadian Patent Application No. 2,572,649 filed on Dec. 29, 2006, and entitled "METHOD AND APPARATUS FOR WIRELESS MANAGEMENT OF ARTICLES". These applications are commonly owned, and are incorporated by reference in their entirety.

FIELD OF THE INVENTION

This invention relates generally to inventory and asset management systems and more specifically to a method and apparatus for wireless management of articles.

BACKGROUND OF THE INVENTION

Inventory and asset systems are rapidly moving towards wireless, electronic management of goods. Data associated with the goods, for example an identification number, is stored in the memory of an electronic tag, which is attached to the goods. In some instances, the tags are attached to individual items. In other instances, tags are attached to the cases in which the items are shipped or to the pallets on which the cases are stacked. In some instances, cases on a pallet are wrapped in plastic to retain the cases on the pallet, and the tags may be placed on the plastic rather than the pallet itself. The data stored in the memory may be wirelessly retrieved by placing the tag in the proximity of an electronic tag reader. The electronic tag reader wirelessly retrieves the data by transmitting a read request to the tag, and the tag responds by transmitting the data to the reader.

A Radio Frequency IDentification (RFID) system, composed of RFID tags and RFID readers, is one example of a wireless electronic tag system being used today. Indeed, RFID devices have changed the manner in which many companies manage inventory and assets. Further, specifically related to management of inventory, many companies now demand that their suppliers place RFID tags on all shipped goods, at the pallet level and/or the case level and/or the item level or a combination. RFID tagged goods which arrive at a warehouse are passed by an RFID reader, which wirelessly retrieves the data stored on the RFID tags. In many cases, a company will only pay a supplier for the goods once the RFID tag has been read, either at the case level or the item level.

An RFID reader requires a period of time to retrieve the data from the RFID tag. When RFID tagged goods arrive at a warehouse, the pallets on which the cases are stacked, are generally passed near an RFID reader, often for only a brief period of time. For example, in some instances, the pallet is passed near the RFID reader only while the pallet is being moved from one part of the warehouse to another. In some circumstances, the time period that the pallet is in the proximity of the RFID reader may be less than the time required by the RFID reader to retrieve the data from all the RFID tags on the pallet. Hence, the data received from a given RFID tag may be incomplete, resulting in an inaccurate inventory count. This may, in turn, lead to an incomplete, disputed or delayed payment transmitted between various entities involved in the shipment of the goods.

There remains a need therefore for an improved method and apparatus for wireless management of articles.

SUMMARY OF THE INVENTION

According to a first broad aspect, the present invention seeks to provide a method implemented by a master RFID tag. The method comprises transmitting at least one first RFID read signal to a plurality of RFID tags local to the master RFID tag and receiving a first RFID response signal from each of the plurality of RFID tags in response to the at least one first RFID read signal. Each of the first RFID response signals comprise an identifier associated with an article. The method further comprises maintaining an article record indicating at least one expected article that is to be managed by the master RFID tag and identifying one or more extra articles by identifying a specific identifier received within the plurality of first RFID response signals that lacks a corresponding specific expected article within the article record. Yet further, the method comprises transmitting a master signal comprising one or more identifiers of the extra articles.

According to a second broad aspect, the present invention seeks to provide a method implemented by a master RFID tag. The method comprises transmitting at least one first RFID read signal to a plurality of RFID tags local to the master RFID tag and receiving a first RFID response signal from each of the plurality of RFID tags in response to the at least one first RFID read signal. Each of the first RFID response signals comprise an identifier associated with an article. The method further comprises maintaining an article record indicating at least one expected article that is to be managed by the master RFID tag and identifying one or more missing articles by identifying a specific expected article within the article record that lacks a corresponding specific identifier received within the plurality of first RFID response signals. Yet further, the method comprises transmitting a master signal comprising one or more identifiers of the missing articles.

According to a third broad aspect, the present invention seeks to provide a master RFID tag comprising a first communication unit, a memory unit, a processing unit and a second communication unit. The first communication unit is operative for transmitting at least one first RFID read signal to a plurality of RFID tags local to the master RFID tag and receiving a first RFID response signal from each of the plurality of RFID tags in response to the at least one first RFID read signal. Each of the first RFID response signals comprise an identifier associated with an article. The memory unit is operative for storing an article record indicating at least one expected article that is to be managed by the master RFID tag. The processing unit is operative for at least one of: identifying one or more extra articles by identifying a specific identifier received within the plurality of first RFID response signals that lacks a corresponding specific expected article within the article record and identifying one or more missing articles by identifying a specific expected article within the article record that lacks a corresponding specific identifier received within the plurality of first RFID response signals. The second communication unit is operative for transmitting a master signal comprising at least one of: one or more identifiers of the extra articles and one or more identifiers of the missing articles.

These and other aspects and features of the present invention will now become apparent to those of ordinary skill in the art upon review of the following description of specific embodiments of the invention in conjunction with the accompanying drawings.

BRIEF DESCRIPTIONS OF THE DRAWINGS

Embodiments of the present invention are described with reference to the following figures, in which.

DETAILED DESCRIPTION OF THE EMBODIMENTS

Figure 1:
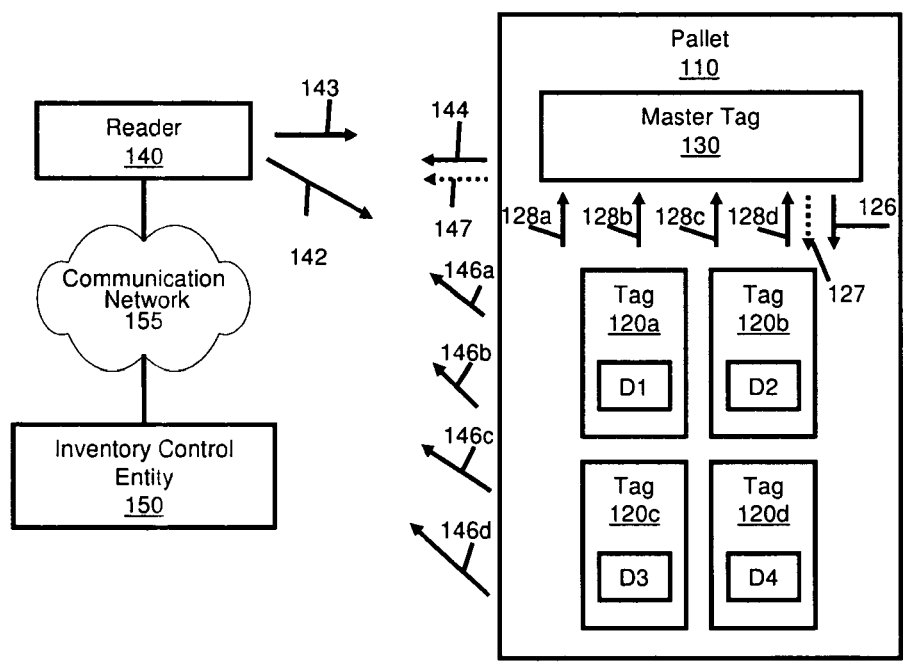
FIGS. 1 and 2 depict a system for wireless management of articles according to a non-limiting embodiment of the present invention.

FIG. 1 depicts a system for wireless management of articles. In some embodiments of the present invention, the system for wireless management of articles can be implemented for inventory loaded onto a transport object, stored in a warehouse or a storage room, displayed in a store, stored on a shelf and the like. In other embodiments of the present invention, the system for wireless management of articles can be implemented for assets for an entity, such as a company, located in a common location. Accordingly, it should be expressly understood that the term "article" is meant to include non-exclusively an item of an inventory, an asset and the like. Therefore, it should be understood that the type of the articles being managed using embodiments of the system presented herein below should not be used as a limitation of the invention contemplated herein.

In the specific non-limiting embodiment depicted with reference to FIG. 1, the articles in question comprise a shipment of goods (not depicted), at least a portion of which is loaded onto a transport object, in this case a pallet 110. For the sake of simplicity, the description to be presented herein below will use an example of the articles comprising the shipment of goods and the system being used for wireless inventory management. However, it is expected that one of ordinary skill in the art will be able to adapt teachings presented herein to other types of articles that need to be managed.

In some instances, the shipment of goods may comprise items which have been placed in cases, one or more items to a given case. In other instances, the shipment of goods may comprise items loaded individually onto the pallet 110. In any event, the goods are tagged with inventory management tags. In a non-limiting example depicted in FIG. 1, a plurality of inventory management tags 120a, 120b, 120c, 120d, are attached to different goods on the pallet 110. In some cases, each of the plurality of inventory management tags 120a, 120b, 120c, 120d is attached to a different case. In other cases, each of the plurality of inventory management tags 120a, 120b, 120c, 120d is attached to a different item within a given case. In yet further cases, some of the plurality of inventory management tags 120a, 120b, 120c, 120d are attached to a case and yet others of the plurality of inventory management tags 120a, 120b, 120c, 120d are attached to items within each case. For the sake of simplicity, the plurality of inventory management tags 120a, 120b, 120c, 120d are sometimes referred to herein below simply as tags.

Each of the plurality of inventory management tags 120a, 120b, 120c, 120d is configured to store data associated with the goods to which they are attached, and may be implemented in software, hardware, control logic or a combination thereof. The stored data may be stored in a memory portion (not depicted). In one non-limiting example, the stored data comprises an identifier D1, D2, D3, D4, respectively, of the goods to which each of the plurality of inventory management tags 120a, 120b, 120c, 120d is attached. In some embodiments, each of the identifiers D1, D2, D3, D4 comprises an inventory control number, for example an item inventory control number, a case inventory control number, depending on the nature of the goods to which each tag is attached. However, each identifier D1, D2, D3, D4 may also comprise a shipment identifier, a pallet identifier and/or, in the instance of tagged items which are placed in a case, a case identifier.

In yet further non-limiting embodiments of the present invention, each of the plurality of inventory management tags 120a, 120b, 120c, 120d can store additional information. This additional information can, for example, be representative of state information of the goods that the associated one of the plurality of inventory management tags 120a, 120b, 120c, 120d is attached to. Some examples of the state information that can be stored within one or more of the plurality of inventory management tags 120a, 120b, 120c, 120d include, but are not limited to, production information, history information, etc. Naturally, one or more of the plurality of inventory management tags 120a, 120b, 120c, 120d can store a plethora of other information, as will become apparent to those of skill in the art.

In one non-limiting embodiment, a specific one of the identifiers D1, D2, D3, D4 that is attached to a specific product may comprise an Electronic Product Code (EPC), which includes identifiers associated with a manufacturer of the specific product, the specific product and the serial number of an item of the specific product, as known to one of skill in the art. In one non-limiting embodiment, an EPC comprises 96 bits, sequentially partitioned as follows: (1) an 8 bit header; (2) a 28 bit EPC manager code, for designating the organization that owns the tag (e.g. the manufacturer of the product); (3) a 24 bit object manager code, for designating the class of product as determined by the EPC manager; and (4) a 36 bit serial number, for uniquely identifying the specific item of the product to which the tag is attached. Hence, in a shipment of similar items, the EPC may be similar for all items, except for the fourth field.

It should be expressly understood that in alternative non-limiting embodiments of the present invention, the EPC may comprise a number of additional fields, as well as some of the fields within the EPC may be of a size different from that specified immediately above. Within some of these non-limiting embodiments of the present invention, the EPC is compiled according to an ISO 1800-6 c standard, a description of which is available from http://www.hightechaid.com/standards/1800.htm. However, in alternative non-limiting embodiments of the present invention, other standards can be used (such as, for example, other ISO 1800-x standards, etc.). In yet further non-limiting embodiments of the present invention, the specific one of the identifiers D1, D2, D3, D4 that is attached to a specific product may be generated according to a proprietary standard.

As depicted in FIG. 1, in some embodiments of the present invention, each of the plurality of inventory management tags 120a, 120b, 120c, 120d is further configured to wirelessly communicate with an inventory management tag reader 140. For the sake of simplicity, the inventory management tag reader 140 is sometimes referred to herein below simply as a reader 140. In one non-limiting embodiment, each of the plurality of inventory management tags 120a, 120b, 120c, 120d is configured to wirelessly receive a read signal 142 from the reader 140 and, in response to receiving the read signal 142, to transmit the data stored in the respective one of the plurality of inventory management tags 120a, 120b, 120c, 120d via a response signal 146a, 146b, 146c, 146d, respectively. In embodiments where the data stored comprises the identifiers D1, D2, D3, D4, respectively, of the goods to which each of the plurality of inventory management tags 120a, 120b, 120c, 120d is attached, the response signal 146a, 146b, 146c, 146d comprises the identifier D1, D2, D3, D4, respectively. Through this signal exchange, the reader 140 is able to wirelessly retrieve data from each of the plurality of inventory management tags 120a, 120b, 120c, 120d.

In some embodiments, the reader 140 may be configured to transmit a plurality of read signals 142 and receive a plurality of response signals 146a, 146b, 146c, 146d from each of the plurality of inventory management tags 120a, 120b, 120c 120d. The reader 140 may be further configured to filter out redundant response signals, in order to filter out redundant data. In other embodiments, the filtering out of redundant data may be performed by another entity within the system of FIG. 1 described below.

As depicted in FIG. 1, in one non-limiting embodiment, the reader 140 is in communication with an inventory management entity 150 via a communication network 155. Within the specific non-limiting embodiment of FIG. 1, the inventory management system 150 is embodied in a stand-alone computing apparatus. However, in alternative non-limiting embodiments of the present invention, the inventory management entity 150 may be embodied in a software module or a sub-system of another system (for example, an inventory management system, etc.) The reader 140 is configured to transmit the retrieved data, such as the identifiers D1, D2, D3, D4 to the inventory management entity 150. The inventory management entity 150 is configured to receive the data from the reader 140 and process the data for inventory management purposes, Examples of the inventory management activities include, but are not limited to, billing, shipping, receiving, re-ordering, replenishing, restocking, maintaining, compliancy reporting, etc. The reader 140 and the inventory management entity 150 will be described in further detail below, with reference to embodiments of the present invention.

In one non-limiting example, each inventory management tag 120a, 120b, 120c, 120d comprises an RFID tag and the reader 140 comprises an RFID reader. RFID tags may be passive or active devices. Passive devices are powered through back scatter or inductively by an RF signal or a magnetic signal, respectively, transmitted from the RFID reader, which is received by an antenna of the RFID tag. Once the RFID tag receives sufficient power, it responds by transmitting the data stored in the RFID tag memory via the antenna. Active RFID devices comprise a power source, such as a battery, for powering a communication portion, associated circuitry and other functionality. In yet further non-limiting embodiments of the present invention, the RFID tag may be a semi-passive or a semi-active device as are known by one of skill in the art.

In the embodiment of FIG. 1, an inventory master tag 130 (sometimes referred to herein below as simply a "master tag 130") is configured for attachment to the goods which are loaded onto the pallet 110. Therefore, the inventory master tag 130 is said to be local to the plurality of inventory management tags 120a, 120b, 120c, 120d. In some embodiments, the master tag 130 is configured for attachment to the pallet 110 itself while, in other embodiments, the master tag 130 is configured for attachment to an item or a case of which the shipment is comprised or to a covering placed over and/or around the goods loaded on to the pallet 110 (the covering for securing the goods onto the pallet 110). It should be understood that the means by which the master tag 130 is attached should not limit the scope of the present invention.

Within the specific non-limiting embodiment of FIG. 1, the master tag 130 is intended for shipment in proximity to the goods loaded onto the pallet 110 and is configured for wireless retrieval of data from inventory management tags (such as, for example, the plurality of inventory management tags 120a, 120b, 120c, 120d). However, in an alternative non-limiting embodiment of the present invention, the master tag 130 may be configured to be attached to a particular object in a particular location (such as, for example, a shelf/display in a store, a location in a warehouse, etc.) or to another transport object (such as, a shipping container, a truck trailer, a train car, a case, a storage container, a box, etc).

In the non-limiting example of FIG. 1, the data to be retrieved comprises the identifiers D1, D2, D3, D4, respectively, from each of the plurality of inventory management tags 120a, 120b, 120c, 120d. In this case, the master tag 130 is configured to transmit one or more read signal(s) 126 to the plurality of inventory management tags 120a, 120b, 120c, 120d. The read signal(s) 126 generated by the master tag 130 may be substantially similar to the read signal 142 generated by the reader 140. In response to receipt of the one or more read signal(s) 126 generated by the master tag 130, each of the plurality of inventory management tags 120a, 120b, 120c, 120d transmits a response signal 128a, 128b, 128c, 128d, respectively. Each of the response signals 128a, 128b, 128c, 128d may be similar to the response signals 146a, 146b, 146c, 146d generated in response to the read signal 142 generated by the reader 140, and may comprise the identifiers D1, D2, D3, D4, respectively.

In some embodiments, the master tag 130 is configured to broadcast a plurality of read signals 126 destined for the plurality of inventory management tags 120a, 120b, 120c, 120d. In an alternative non-limiting embodiment of the present invention, the master tag 130 can be configured to send a read signal 126 specifically destined for a specific one of the plurality of inventory management tags 120a, 120b, 120c, 120d. How the master tag 130 addresses the read signal 126 to the specific one of inventory management tags 120a, 120b, 120c, 120d is known to those of skill in the art and, as such, will not be addressed here in any detail.

In those embodiments of the present invention, where the master tag 130 transmits the read signal 126 destined to the specific one of inventory management tags 120a, 120b, 120c, 120d, responsive to receipt thereof, the specific one of inventory management tags 120a, 120b, 120c, 120d is configured to transmit their respective response signals 146a, 146b, 146c, 146d. In those embodiments of the present invention, where the master tag 130 is configured to broadcast the plurality of read signals 126, responsive to receipt thereof, one or more of the plurality of inventory management tags 120a, 120b, 120c 120d transmits one or more of their respective response signals 146a, 146b, 146c, 146d. The master tag 130 may be further configured to filter out redundant response signals, in order to filter out redundant data.

In non-limiting embodiments of the present invention, the master tag 130 is further configured to store the retrieved data and to wirelessly transmit it to the reader 140, via a master response signal 144. The master response signal 144 is generated in response to receiving a read signal 143 generated by the reader 140. In some embodiments, the read signal 143 is substantially similar to the read signal 142. Within these embodiments, the read signal 143 may be further received by each of the plurality of inventory management tags 120a, 120b, 120c, 120d, which may, in response, generate the response signals 146a, 146b, 146c, 146d, respectively. For example, in embodiments where each inventory management tag 120a, 120b, 120c, 120d comprises an RFID tag, and the reader 140 comprises an RFID reader, the master response signal 144 generated by the master tag 130 may comprise an RFID response signal. Hence, in response to the read signal 143, each inventory management tag 120a, 120b, 120c, 120d and the master tag 130 may respond by generating an RFID signal for transmission to the reader 140.

In other embodiments, the read signal 143 is selectively received at the master tag 130. In one non-limiting embodiment, the read signal 126 may be transmitted at a first frequency, and the read signal 143 may be transmitted at a second frequency. In these embodiments, the plurality of inventory management tags 120a, 120b, 120c, 120d may be configured to receive read signals at only the first frequency, while the master tag 130 may be configured to receive read signals at only the second frequency. Hence, in these embodiments, the transmission of the read signal 143 will not result in the generation of response signals 146a, 146b, 146c, 146d by the plurality of inventory management tags 120a, 120b, 120c, 120d.

Other embodiments for selectively receiving the read signal 143 at the master tag 130, will be described below.

For instance, in some embodiments of the present invention as will be described in detail below, the master tag 130 is further configured to transmit a blocking signal 127 to at least one of the plurality of inventory management tags 120a, 120b, 120c, 120d. In other embodiments, the master tag 130 is further configured to transmit a blocking signal 147 to the reader 140. The blocking signals 127 and 147 are described below with reference to FIG. 6.

In embodiments where the reader 140 comprises an RFID reader and the master response signal 144 comprises an RFID response signal, the read signal 143 may be received at the master tag 130 when the master tag 130 is in proximity of the reader 140. For the avoidance of doubt, the term RFID refers to a broad range of technologies that use RF to uniquely identify an article. Examples of such technologies include, but are not limited to, ISO 1800-x based technologies, RuBee based technologies (ex. IEEE 1902.1), as well as other RFID technologies. However, in other embodiments, the master tag 130 may be configured to receive the read signal 143 through a wireless network (not depicted). In these embodiments, the master tag 130 may be configured to receive the read signal 143 when the master tag 130 is not in the proximity of the reader 140. In one non-limiting embodiment, the master tag 130 and the reader 140 may comprise wireless communication modules utilizing, for example, CDMA, GSM, WiMax, WiFi, satellite, Bluetooth™, Zigbee, etc. standards. Within these embodiments, the plurality of inventory management tags 120a, 120b, 120c, 120d may also comprise wireless communication modules. In other embodiments, the plurality of inventory management tags 120a, 120b, 120c, 120d may comprise RFID tags as described above and the master tag 130 may be configured to communicate both with RFID tags proximate the master tag 130 and with wireless communication modules through a wireless network.

The master response signal 144 may comprise the data previously retrieved from the plurality of inventory management tags 120a, 120b, 120c, 120d, such as the identifiers D1, D2, D3, D4 in the non-limiting example. Hence, by communicating with the master tag 130, the reader 140 may retrieve the data stored on the plurality of inventory management tags 120a, 120b, 120c, 120d without necessarily communicating with each of the plurality of inventory management tags 120a, 120b, 120c, 120d. The master tag 130 may be implemented in software, hardware, control logic or a combination thereof.

Figure 2:
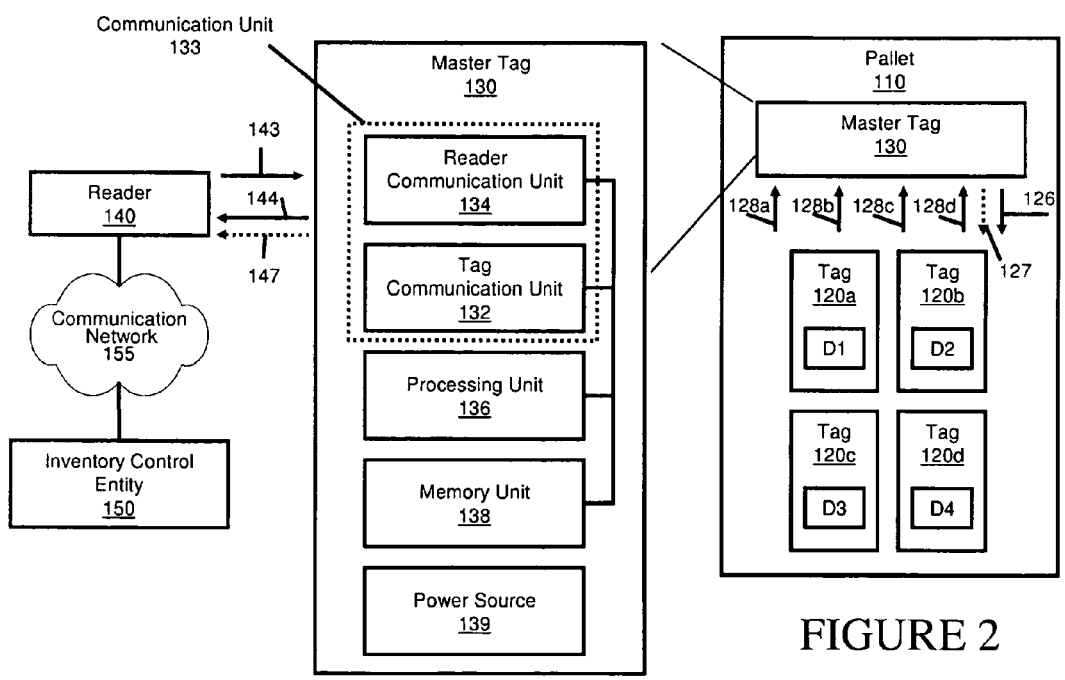

FIG. 2 depicts a block diagram of one non-limiting embodiment of the master tag 130 within the system depicted in FIG. 1, with like components represented by like numbers. Within this embodiment, the master tag 130 comprises a tag communication unit 132 for wireless retrieval of data from the plurality of inventory management tags 120a, 120b, 120c, 120d and a reader communication unit 134 for wireless transmission of data retrieved from the plurality of inventory management tags 120a, 120b, 120c, 120d to the reader 140. In some embodiments, the functionality of the tag communication unit 132 and the reader communication unit 134 may be combined within a single communication unit 133, as indicated by the dotted outline in FIG. 2. In one non-limiting embodiment, the tag communication unit 132 comprises an antenna configured to exchange signals with the plurality of inventory management tags 120a, 120b, 120c, 120d and the reader communication unit 134 may also comprise an antenna configured to exchange signals with the reader 140. In other embodiments, the tag communication unit 132 and the reader communication unit 134 could share a common antenna.

As depicted in FIG. 2, the master tag 130 further comprises a processing unit 136 and a memory unit 138 coupled to the tag communication unit 132 and the reader communication unit 134. The processing unit 136 is configured to perform various functions to be described herein below and may be implemented in software, hardware, control logic or a combination thereof. The memory unit 138 is configured to store inventory data, including data retrieved from the plurality of inventory management tags 120a, 120b, 120c, 120d. Among other functions, the processing unit 136 is configured to process data received at the tag communication unit 132 and/or the reader communication unit 132 and/or the data stored at the memory unit 138.

Figure 3:
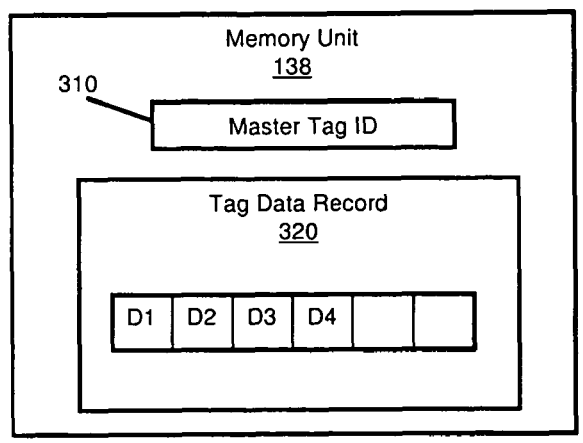
FIG. 3 depicts a non-limiting example of a memory unit within a master tag.

FIG. 3 depicts a non-limiting example of the memory unit 138. Within this non-limiting example, the memory unit 138 comprises a record 310, for storing an identifier of the master tag 130, for example an identification number. In one non-limiting example, the identifier of the master tag 130 may comprise an EPC, though it should be understood that any appropriate identifier format could be utilized. In one non-limiting example, the identifier of the master tag 130 may be stored at the memory 138 at the time of manufacture. In other non-limiting examples, the identifier of the master tag 130 may be stored at the memory 138 during a provisioning process which may occur before or after the master tag 130 is attached to the pallet 110. As depicted in FIG. 3, the memory unit 138 further comprises a tag data record 320 (sometimes referred herein below as simply a "record 320"), which contains a plurality of fields for storing data received by the tag communication unit 132. In general, the number of fields is not particularly limited, except by the size of the memory. Although the record 320 is shown with six fields, more or fewer fields are within the scope of the invention.

Returning to the description of FIG. 2, components of the master tag 130 (for example, at least some of the reader communication unit 134, the tag communication unit 132, the processing unit 136 and the memory unit 138) may be powered by a power source 139. As will occur to one of skill in the art, the power source 139 may comprise an battery, or a connection to another power source associated with the pallet 110.

Figure 4:
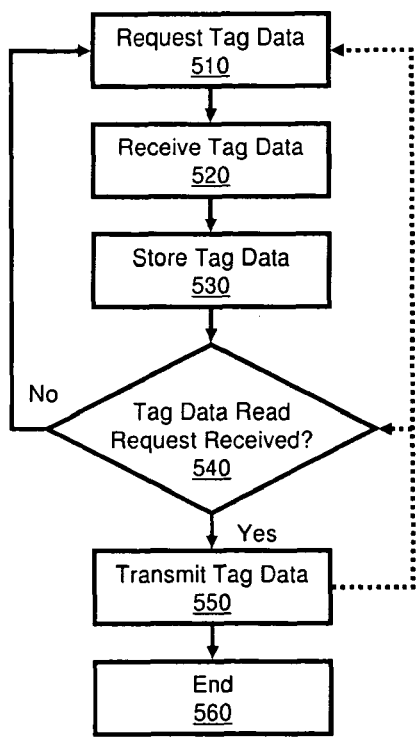
FIG. 4 depicts a flow chart of steps performed by a master tag according to a non-limiting embodiment of the present invention.

A method for wireless inventory management according to a non-limiting embodiment of the present invention will now be described with reference to FIG. 4. In order to assist in the explanation of the method, it will be assumed that the method of FIG. 4 is operated using embodiments of the master tag 130 depicted in FIG. 2. It should be understood that the steps in the method of FIG. 4 need not be performed in the sequence shown. Further, it is to be understood that the master tag 130 of FIG. 2 and/or the method of FIG. 4 can be varied, and need not work as discussed herein in conjunction with each other, and that such variations are within the scope of the present invention.

At step 510, the master tag 130 transmits a request for inventory management tag data. Within the embodiment depicted in FIG. 2, the request for inventory management tag data comprises the read signal 126, which is transmitted to the plurality of inventory management tags 120a, 120b, 120c, 120d by the tag communication unit 132. The transmission of the read signal 126 by the tag communication unit 132 may be in response to a trigger received from the processing unit 136. In some non-limiting embodiments, the tag communication unit 132 transmits a single read signal 126; however, in other non-limiting embodiments, the tag communication unit 132 may transmit a plurality of read signals 126. In some embodiments of the present invention, the tag communication unit 132 may transmit the plurality of read signals 126 in a periodic manner. Within these embodiments, the processing unit 136 may further comprise or be coupled to a timing device (not depicted) and the processing unit 136 may be configured to transmit a trigger to the tag communication unit 132 at periodic intervals. However, other arrangements as to how the tag communication unit 132 may transmit the plurality of read signals 126 are possible.

At step 520, in response to transmitting the request for inventory management tag data, the master tag 130 receives inventory management tag data. Continuing with the example depicted in FIG. 2, the inventory management tag data may be received at the tag communication unit 132 as response signals 128a, 128b, 128c, 128d, from the respective ones of the plurality of inventory management tags 120a, 120b, 120c, 120d. In some embodiments, the tag communication unit 132 is configured to receive a plurality of response signals concurrently.

In other non-limiting embodiments, the tag communication unit 132 may be configured to receive and process one response signal at a time. In these embodiments, the tag communication unit 132 may be configured to ignore successive response signals until a current response signal has been received and processed. In other words, the tag communication unit 132 may be operable to process response signals in a First In First Out (FIFO) basis. In other embodiments, First Expire First Out (FEFO) or other algorithms can be used.

In embodiments where the read signal 126 is transmitted in a periodic manner, each of the plurality of inventory management tags 120a, 120b, 120c, 120d, may transmit a response signal 128a, 128b, 128c, 128d, respectively, in response to each read signal 126 received. Within these embodiments, the processing unit 136 may be configured to filter out redundant inventory management tag data received. In one non-limiting embodiment, the processing unit 136 may be configured to filter out redundant inventory management tag data received by comparing the inventory management tag data received with the inventory management tag data previously received. This comparison may occur after the inventory management tag data received is stored in the memory unit 138, described in relation to step 530, or prior to storing the inventory management tag data received in the memory unit 138.

In an alternative non-limiting embodiment of the present invention, the master tag 130 may first broadcast a plurality of read signals 126 to the plurality of inventory management tags 120a, 120b, 120c, 120d. Alternatively, the master tag 130 may keep broadcasting a plurality of read signals 126 to the plurality of inventory management tags 120a, 120b, 120c, 120d in a periodic manner for a pre-determined period of time (such as, for example, 30 seconds, 1 minutes, 5 minutes, 30 minutes, 1 hour, etc.). Thereafter, the master tag 130 may transmit a read signal 126 destined for a particular one of the plurality of inventory management tags 120a, 120b, 120c, 120d. The particular one of the plurality of inventory management tags 120a, 120b, 120c, 120d includes those of the plurality of inventory management tags 120a, 120b, 120c, 120d that has not transmitted its respective response signal 128a, 128b, 128c, 128d.

In some embodiments, all of the response signals 128a, 128b, 128c, 128d may be received, representing a full accounting of the inventory of goods present on the pallet 110. However, in other embodiments, some of the response signals 128a, 128b, 128c, 128d may not be received, representing only a partial accounting of the inventory of goods present on the pallet 110.

In some embodiments of the present invention, as part of step 530, once the master tag 130 has received a specific response signal (i.e. one of the response signals 128a, 128b, 128c, 128d) from a specific one of the plurality of inventory management tags 120a, 120b, 120c, 120d, the master tag 130 may be configured to temporarily disable the specific one of the of the plurality of inventory management tags 120a, 120b, 120c, 120d. This can be done, for example, by transmitting a control signal for causing the specific one the plurality of inventory management tags 120a, 120b, 120c, 120d to enter a "SLEEP" mode. Any other suitable approach for causing the specific one of the plurality of inventory management tags 120a, 120b, 120c, 120d to be temporarily disabled can be used. In an alternative non-limiting embodiment of the present embodiment, the specific one of the plurality of inventory management tags 120a, 120b, 120c, 120d can automatically enter the sleep mode upon transmission of the specific response signal. Yet in further non-limiting embodiments, the specific one of the plurality of inventory management tags 120a, 120b, 120c, 120d can enter the sleep mode upon elapse of a pre-determined time interval (ex. 30 seconds, 1 minute, 5 minutes, 10 minutes, 1 hour, etc.) from the transmission of the specific response signal.

At step 530, the memory unit 138 stores the received inventory management tag data. In some embodiments, the tag communication unit 132 is configured to pass the inventory management tag data received directly to the memory unit 138 for storage. In other embodiments, the tag communication unit 132 is configured to pass the inventory management tag data received to the processing unit 136, which then passes the data to the memory unit 138 for storage. Within these embodiments, the processing unit 136 may be configured to process the inventory management tag data received for storage. Within one non-limiting example, the processing unit 136 compresses the inventory management tag data received to reduce the amount of space needed to store the inventory management tag data at the memory unit 138. In other embodiments, the processing unit 136 is configured to organize the inventory management tag data prior to storage at the memory unit 138. In one non-limiting example, the processing unit 136 may organize the tag data received in numerical and/or alphabetical order.

In some embodiments, the inventory management tag data received is stored in the record 320 of the memory unit 138, as depicted in FIG. 3. Although the record 320 is depicted with the inventory management tag data in numerical order of the identifiers D1, D2, D3, D4 of the plurality of inventory management tags 120a, 120b, 120c, 120d, respectively, the order in which the inventory management tag data is stored is not particularly limited. For example, the inventory management tag data may also be stored in the order the inventory management tag data was received, or in a random order.

Within other embodiments, the processing unit 136 is configured to format the identifiers D1, D2, D3, D4 into a single data set for later transmission to the reader 140, the single data set also stored at the memory unit 138. In some embodiments, the single data set may be stored in the record 320; however, in other embodiments, the single data set may be stored in another record (not depicted) of the memory unit 138. Within embodiments where the single data set is stored at the memory unit 138, the individual identifiers D1, D2, D3, D4 may not be stored, as the storing of the individual identifiers D1, D2, D3, D4 may be redundant.

At step 540, the processing unit 136 is configured to determine if an inventory management tag data read request has been received. In one non-limiting embodiment, the inventory management tag data read request may comprise the read signal 143 generated by the reader 140 being received at the reader communication unit 134. In embodiments where the read signal 143 comprises an RFID read signal, the RFID read signal may be received when the master tag 130 is in proximity of the reader 140. In other embodiments, where the master tag 130 and the reader 140 comprise wireless communication modules, the read signal 143 may be received through a wireless communication network (not depicted), as described above.

If an inventory management tag data request has been received, then at step 550, the master tag 130 is configured to transmit the inventory management tag data to the reader 140. In some embodiments, the reader communication unit 134 is configured to transmit the master response signal 144; the master response signal 144 comprising at least a portion of the tag data stored at the record 320. Within other non-limiting embodiments, the master response signal 144 may further comprise the master tag identifier stored at the record 310 and/or processed versions of the tag data stored at the record 320 (i.e. the aforementioned single data set). The inventory management tag data may be transmitted in the order stored at the memory 138, or it may be transmitted in another order. In some embodiments, the master response signal 144 may comprise a single transmission, the single transmission comprising a single data set comprising all of the tag data stored at the memory unit 138. For example, the master response signal 144 may comprise the identifiers D1, D2, D3, D4 transmitted in a single transmission. Within these embodiments, the processing unit 136 may be configured to retrieve the identifiers D1, D2, D3, D4, format the identifiers D1, D2, D3, D4 into a consolidated data set for transmission to the reader 140, and pass the consolidated data set to the reader communication unit 134 for transmission to the reader 140 via the master response signal 144. Within these embodiments, the receipt of the consolidated data set at the reader communication unit 134 may trigger the transmission of the master response signal 144.

In embodiments where the single data set is processed as the identifiers D1, D2, D3, D4 are received, and the single data set is saved at the memory unit 138 as described above, the processing unit 136 may be configured to retrieve the single data set, format the single data set for transmission to the reader 140, and pass the formatted single data set to the reader communication unit 134, for transmission to the reader 140 via the master response signal 144.

In some embodiments, the inventory management tag data may not be stored in a format which is suitable for handling by the reader 140. In these embodiments, the processing unit 136 may be configured to process the inventory management tag data into a format that is suitable for handling by the reader 140, prior to transmission of the master response signal 144. For example, in embodiments where the inventory management tag data is compressed or encrypted, the processing unit 136 may be configured to de-compress or decrypt the inventory management tag data.

In further non-limiting embodiments, the master response signal 144 may comprise a plurality of transmissions, each of the plurality of transmissions comprising at least one inventory management tag datum. Within these embodiments, the processing unit 136 may be configured to retrieve the identifiers D1, D2, D3, D4, format each of the identifiers D1, D2, D3, D4 into a format suitable for transmission to the reader 140, and pass the formatted identifiers to the reader communication unit 134 for transmission to the reader 140 via the master response signal 144. Within these embodiments the receipt of one or more formatted identifier(s) at the reader communication unit 134 may trigger the transmission of a master response signal 144.

In some embodiments, once the inventory management tag data has been transmitted, the master tag 130 may continue to request inventory management tag data at step 510, in preparation for further read requests. In other embodiments, the master tag 130 may not continue to request inventory management tag data, but may respond to further read requests at step 540. In embodiments where the master tag 130 comprises a timing device, the master tag 130 may continue to request inventory management tag only for a given time period. In other embodiments, the master tag 130 may not continue to request inventory management tag data if all expected inventory management tag data is already stored at the record 320 as will be described in greater detail herein below. In yet other embodiments, the master tag 130 may transmit only a defined number of inventory management tag data read requests.

In further non-limiting embodiments, the master tag 130 may be configured to undergo an end procedure at step 560. In some embodiments, the end procedure may include clearing the memory unit 138 of stored data. In other embodiments, the end procedure may include shutting down power or entering a sleep state, in order to preserve the power source 139. In some embodiments, the master tag 130 may further comprise a switch (not depicted) to turn power back on, or to exit the sleep state. Within other embodiments, at least one of the reader communication unit 134 and the tag communication unit 132 may be configured to receive a "WAKE" command from a provisioning entity to turn the master tag 130 back on. In some embodiments the provisioning entity may comprise the reader 140.

Figure 5:
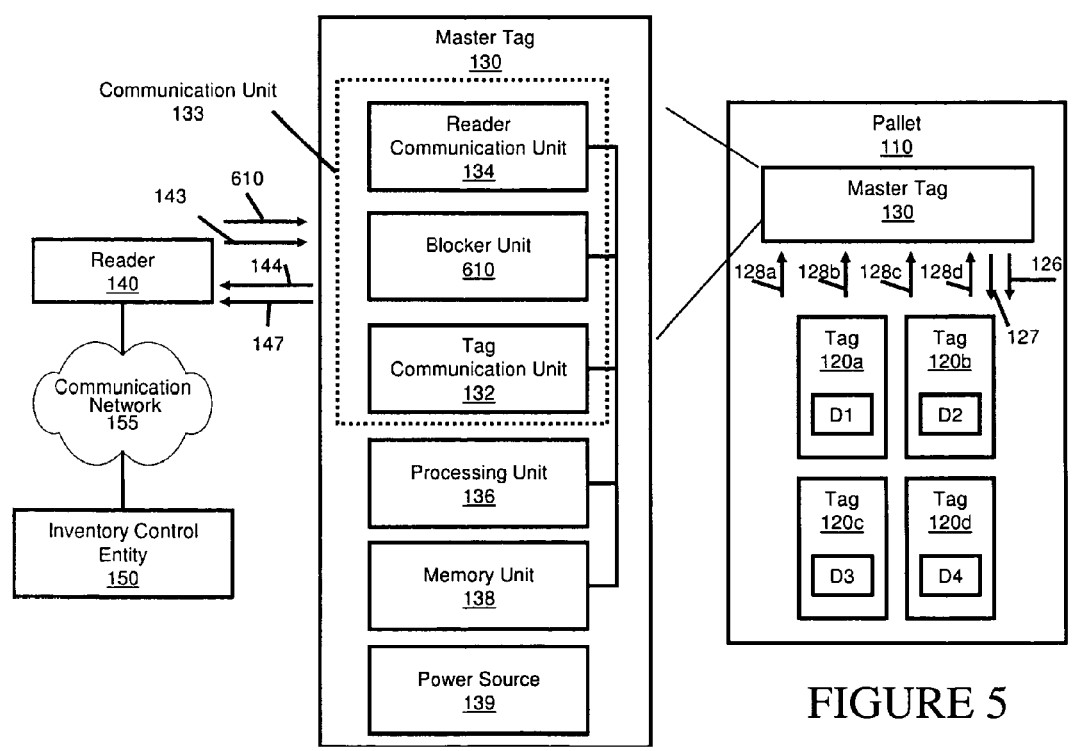
FIG. 5 depicts a system for wireless management of articles according to an alternative non-limiting embodiment of the present invention.

Reference is now made to FIG. 5, which depicts an alternative non-limiting embodiment of a system for wireless inventory management of a shipment of goods. The system depicted in FIG. 5 is substantially similar to the system depicted in FIG. 1, with like components depicted with like numbers; however, a master tag 130' of FIG. 5 which is similar to the master tag 130 further comprises a blocker unit 610, coupled to the processing unit 136, for blocking communication between the plurality of inventory management tags 120a, 120b, 120c, 120d, and the reader 140. In some embodiments, the functionality of the blocker unit 610 may be combined with the tag communication unit 132, the reader communication unit 134 or a combined communication unit 133' (similar to the combined communication unit 133 but further comprising the blocker unit 610), as indicated by the dotted outline in FIG. 5. The blocker unit 610 comprises an antenna which may be shared with the tag communication unit 132 and/or the reader communication unit 134. In some embodiments, the antenna is configured to exchange signals with the plurality of inventory management tags 120a, 120b, 120c, 120d, while, in other embodiments, the antenna is configured to exchange signals with the reader 140.

Generally speaking, the blocker unit 610 can be configured to block a specific one of the plurality of inventory management tags 120a, 120b, 120c, 120d. In an alternative non-limiting embodiment, the blocker unit 610 can be configured to block a set of inventory management tags (such as, a group comprising some or all of the plurality of inventory management tags 120a, 120b, 120c, 120d). Alternatively, the blocker unit 610 can be configured to block all of the plurality of inventory management tags 120a, 120b, 120c, 120d located within a pre-determined distance therefrom.

Embodiments which demonstrate the functionality of the blocker unit 610 will now be described with reference to FIG. 6, which depicts a method for wireless inventory management according to an alternative non-limiting embodiment. In order to assist in the explanation of the method, it will be assumed that the method of FIG. 6 is operated using the embodiment of the master tag 130' depicted in FIG. 5.

Figure 6:
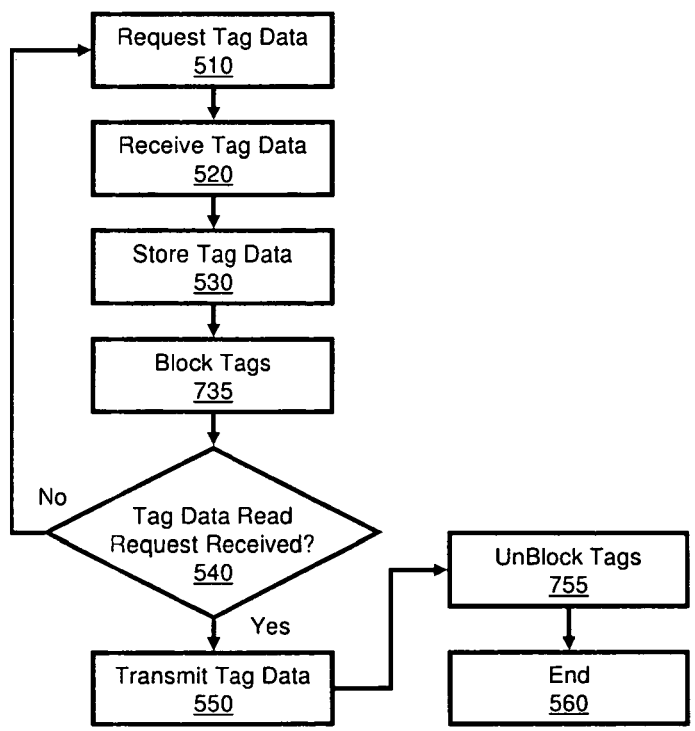
FIG. 6 depicts a flow chart of steps performed by a master tag according to an alternative non-limiting embodiment of the present invention.

The method depicted in FIG. 6 is substantially similar to the method depicted in FIG. 4, with like steps represented by like numbers. However, the method depicted in FIG. 6 further comprises a step 735 of blocking the inventory management tags from communicating with the reader 140, once the inventory management tag data has been received at step 520 and/or stored in the memory unit 138 at step 530. The method depicted in FIG. 6 further comprises a step 755 to unblock the inventory management tags from communicating with the reader 140, once the master tag 130' has transmitted the inventory management tag data to the reader 140.

Within non-limiting embodiments where the blocker unit 610 is configured to communicate with the plurality of inventory management tags 120a, 120b, 120c, 120d, the blocker unit 610 may be configured to transmit a blocking signal 127 at step 735 to one or more of the plurality of inventory management tags 120a, 120b, 120c, 120d. Specifically, blocker unit 610 may send a blocking signal 127 to the plurality of inventory management tags 120a, 120b, 120c, 120d whose data has been received at the master tag 130. Within this non-limiting embodiment, the blocking signal 127 may comprise a blocking command instructing at least one of the plurality of inventory management tags 120a, 120b, 120c, 120d not to respond to further requests for inventory management tag data. In some embodiments, the blocking command may comprise a "SLEEP" or a "DISABLE" command. Within these embodiments, the plurality of inventory management tags 120a, 120b, 120c, 120d which receive and process the blocking command may not respond to further requests for inventory management tag data from either the reader 140, or from the master tag 130' itself.

In embodiments where the plurality of inventory management tags 120a, 120b, 120c, 120d comprise RFID tags, the blocking signal 127 may comprise a plurality of signals, each signal for engaging a specific RFID tag in one of a plurality of read sessions. RFID tags typically may be engaged in multiple read sessions, to a maximum number of read sessions. Hence, in this embodiment, the blocking signal 127 may comprise a plurality of signals for engaging each of the RFID tags into the maximum number of read sessions. In a non-limiting example, if the maximum number of read sessions that an RFID tag may be engaged in is three concurrent read sessions at any given point of time, then the blocking signal 127 may comprise three signals intended for a specific RFID tag, each signal for engaging the RFID tag in a read session. In this non-limiting scenario, the RFID tag is unable to respond to further requests for tag data from either the reader 140 or the master tag 130' itself.

Within non-limiting embodiments where the blocking signal 127 is transmitted to one or more of the plurality of inventory management tags 120a, 120b, 120c, 120d, the plurality of inventory management tags 120a, 120b, 120c, 120d are configured to be addressable by the master tag 130'. Within these embodiments, the blocking signal 127 may comprise an identifier(s) of the inventory management tag(s) 120a, 120b, 120c, 120d that are to be blocked In one non-limiting embodiment, the identifier(s) may comprise one or more of the identifiers D1, D2, D3, D4 stored at the plurality of inventory management tags 120a, 120b, 120c, 120d. Within these embodiments, the plurality of inventory management tags 120a, 120b, 120c, 120d may be configured to accept the blocking command instructing it not to respond to further requests for inventory management tag data, only if the blocking signal 127 comprises the corresponding identifier D1, D2, D3, D4.

In non-limiting embodiments in which the plurality of inventory management tags 120a, 120b, 120c, 120d are configured to receive the blocking command, once the blocking command is received, the plurality of inventory management tags 120a, 120b, 120c, 120d are further configured to process the blocking command and, in response, to not respond to further requests for inventory management tag data. In a non-limiting example, once the blocking command has been processed by one of the plurality of inventory management tags 120a, 120b, 120c 120d, that tag may not transmit the response signal 128a, 128b, 128c, 128d, respectively, if the read request 143 or the read request 126 is received. In this manner, when the reader 140 transmits an inventory management tag data read request to the master tag 130' at step 540 of FIG. 4, for example, a given one of the plurality of inventory management tags 120a, 120b, 120c, 120d which has previously processed the blocking signal 127 will not respond to any further inventory management tag data read request (such as, for example, a further read request 143). Hence, in some embodiments, the read request 143 can result only in the response 144 from the master tag 130'. This prevents the reader 140 from receiving redundant data and further mitigates the reader 140 from becoming overly busy processing large numbers of response signals at one time. In addition, further read requests from the master tag 130', for example the read signal 126, may also be ignored. This can relieve the master tag 130' from filtering redundant data.

In embodiments where at least one of the plurality of inventory management tags 120a, 120b, 120c, 120d has not been blocked and, therefore, is considered to be an "unblocked inventory management tag", the read request 143 may also result in a response 128a, 128b, 128c, 128d, respectively, from the at least one unblocked inventory management tag.

In some non-limiting embodiments, some of the plurality of inventory management tags 120a, 120b, 120c, 120d may not have been blocked as the master tag 130' may not have been able to retrieve the data from these inventory management tags. Within these embodiments, the read request 143 from the reader 140 may result in a response signal 128a, 128b, 128c, 128d from the unblocked inventory management tags. In this case, the reader 140 may receive the master response signal 144 as well as one or more of the response signals 128a, 128b, 128b, 128d, which overall may provide a more complete accounting of the inventory of the goods on the pallet 110.

In other non-limiting embodiments, some of the plurality of inventory management tags 120a, 120b, 120c, 120d may not have been blocked as the blocking signal 127 may not have been received or properly processed at these inventory management tags. In some embodiments, this may be due to the configuration of the goods present on the pallet 110. Within these embodiments, the read request 143 from the reader 140 may result in a response 128a, 128b, 128c, 128d from unblocked inventory management tags. The response 128a, 128b, 128c, 128d may include data which is also present in the master response signal 144. In these embodiments, the reader 140 may be further configured to filter redundant data or pass the redundant data to the inventory management entity 150.

As depicted in FIG. 6 at step 755, in some non-limiting embodiments, the blocking unit 610 may further be configured to unblock any of the plurality of inventory management tags 120a, 120b, 120c, 120d that were blocked at step 735, This unblocking step in non-limiting embodiments occurs once the tag data has been transmitted from the master tag 130' to the reader 140 at step 550. In embodiments where a blocking command has been transmitted to one or more of the plurality of inventory management tags 120a, 120b, 120c, 120d at step 735, the blocking unit 610 may be configured to transmit an unblocking command to the plurality of inventory management tags 120a, 120b, 120c, 120d at step 755; the unblocking command for instructing the one or more of the plurality of inventory management tags 120a, 120b, 120c or 120d that were previously blocked to respond to further requests for tag data. In some non-limiting embodiments, the unblocking command may comprise a "WAKE" or an "ENABLE" command. In other embodiments, where the blocking signal 127 of step 735 comprises a plurality of signals for engaging one or more of the plurality of inventory management tags 120a, 120b, 120c, 120d in the maximum number of read sessions possible, the blocking unit 610 may be configured to terminate one or more of the read sessions with the blocked tags (for example, in some cases, ceasing to transmit the blocking signal 127). In this case, the plurality of inventory management tags 120a, 120b, 120c, 120d may respond to further requests for tag data.

In some non-limiting embodiments, the unblocking command (which may be within an unblocking signal similar to the blocking signal 127), may be transmitted to all of the plurality of inventory management tags 120a, 120b, 120c, 120d, instructing/enabling them to respond to further requests for inventory management tag data. In other embodiments, a plurality of unblocking signals may be transmitted, each comprising an unblocking command intended for a specific inventory management tag 120a, 120b, 120c, 120d. In these embodiments, the signals may further comprise an identifier of the inventory management tag 120a, 120b, 120c, 120d, as described above.

In these non-limiting embodiments, the plurality of inventory management tags 120a, 120b, 120c, 120d are configured to receive the unblocking signal(s), and to extract the unblocking command. The plurality of inventory management tags 120a, 120b, 120c, 120d are further configured to process the unblocking command and, in response, respond to further requests for inventory management tag data. Once again, it should be understood that in some non-limiting embodiments, the unblocking signal could be the same as the blocking signal 127 but terminating the sessions initiated to utilize the maximum number of sessions available to the tag. Hence, in this case, the unblocking signal enables the tag to initiate further data read sessions with other readers or the master tag 130'.

In some non-limiting embodiments, the blocking unit 610 may be configured to communicate with the reader 140. Within these embodiments, at step 735, the blocking unit 610 may be configured to transmit a blocking signal 147 to the reader 140, in order to block the reader 140 from communicating with the one or more of the plurality of inventory management tags 120a, 120b, 120c, 120d, whose data has been received at the master pallet tag 130'. In some non-limiting embodiments, the blocking signal 147 can comprise a signal that indicates which response signals to reject and/or not process.

In non-limiting embodiments where the plurality of inventory management tags 120a, 120b, 120c, 120d comprise RFID tags and the reader 140 comprises an RFID reader, the RFID reader may be blocked from communicating with the RFID tags by transmitting the blocking signal 147 to the reader 140 if the blocking signal 147 simulates at least a portion of the response signal 128a, 128b, 128c, 128d.

In general, RFID readers may communicate with one RFID tag at a time. As described above, if the RFID reader receives more than one RFID response, the reader may detect a collision of signals and execute a singulation algorithm, which allows the reader to communicate with conflicting RFID tags, one at a time. Methods of blocking RFID tags from being read by interfering with this singulation algorithm are described in U.S. patent application Ser. No. 10/673,540 which is incorporated herein by reference. Generally speaking, blocker algorithms block RFID tags whose identifiers share a common prefix from communicating with the RFID reader. For example, in the embodiment where the RFID tag identifier is an EPC, the blocker unit 610 may transmit a blocking signal 147 for blocking RFID tags having a particular range of headers, a particular range of EPC manager codes, a particular range of object manager codes, or a particular range of serial numbers.

Therefore, in non-limiting embodiments where the plurality of inventory management tags 120a, 120b, 120c, 120d, whose data has been retrieved by the master tag 130', share a common prefix, the blocker unit 610 may transmit a blocking signal 147 which blocks the reader 140 from communicating with those inventory management tags 120a, 120b, 120c, 120d. In some embodiments, the blocking signal 147 may also block the master tag 130' itself from communicating with those inventory management tags 120a, 120b, 120c, 120d.

In these embodiments, at step 755, the blocker unit 610 may be configures to cease to transmit the blocking signal 147 which interferes with the singulation algorithm at the reader 140. In other non-limiting embodiments, the blocking unit 610 could transmit an unblock signal to the reader 140 at step 755.

In another non-limiting embodiment, the blocker unit 610 may be configured to communicate with both the reader 140 and the plurality of inventory management tags 120a, 120b, 120c, 120d. Within this embodiment, the blocker unit 610 may transmit a code to each of the plurality of inventory management tags 120a, 120b, 120c, 120d as it is read, to ensure that those inventory management tags 120a, 120b, 120c, 120d that have been read share a common prefix. In this embodiment, the master tag 130' is further configured to transmit the code to individual inventory management tags 120a, 120b, 120c, 120d, similar to the method of addressing individual inventory management tags 120a, 120b, 120c, 120d as described above. In embodiments where the plurality of inventory management tags 120a, 120b, 120c, 120d comprise RFID tags and the identifiers D1, D2, D3, D4 comprise an EPC, the master tag 130' may transmit the code to RFID tags which have been read, for causing a change in a leading bit or bits of the serial number. In one non-limiting embodiment, this code may be transmitted via the blocking signal 127. In this embodiment, the master tag identifier, stored in the memory unit 138, may also comprise an EPC, which shares a common leading bit or bits of the serial number with unread RFID tags. In a non-limiting example, the leading bit on all unread, and hence unblocked, RFID tags may be "0". In addition, the leading bit in the master tag identifier may also be "0". As the RFID tags are read, the blocker unit 610 may transmit a tag specific key to each RFID tag, causing the leading bit to flip to "1". In the presence of the reader 140, the blocker unit 610 may then block the reader 140 from reading all RFID tags that are associated with a serial number with the leading bit of "1".

In this case, the reader 140 will be able to retrieve the data from the master tag 130', as well as the data from any of the unblocked RFID tags.

In these embodiments, at step 755, the blocker unit 610 may cease transmitting the blocking signal 147 which interferes with the singulation algorithm at the reader 140. As well, the blocker unit 610 may further transmit a tag specific key to each RFID tag which has been read, causing the leading bit to flip back to its original value, for example from a "1" to a "0".

Although described above with a prefix and with the specific "0" and "1" bits identifying read and unread tags, it should be understood that many other options are possible. For instance, other bits could be modified within or outside of the identifiers (such as the EPC) to indicate that a tag has been read or unread. Further, in other non-limiting embodiments, a separate flag bit could be maintained on the tags to manage the indication of whether they have been read or not.

Figure 7:
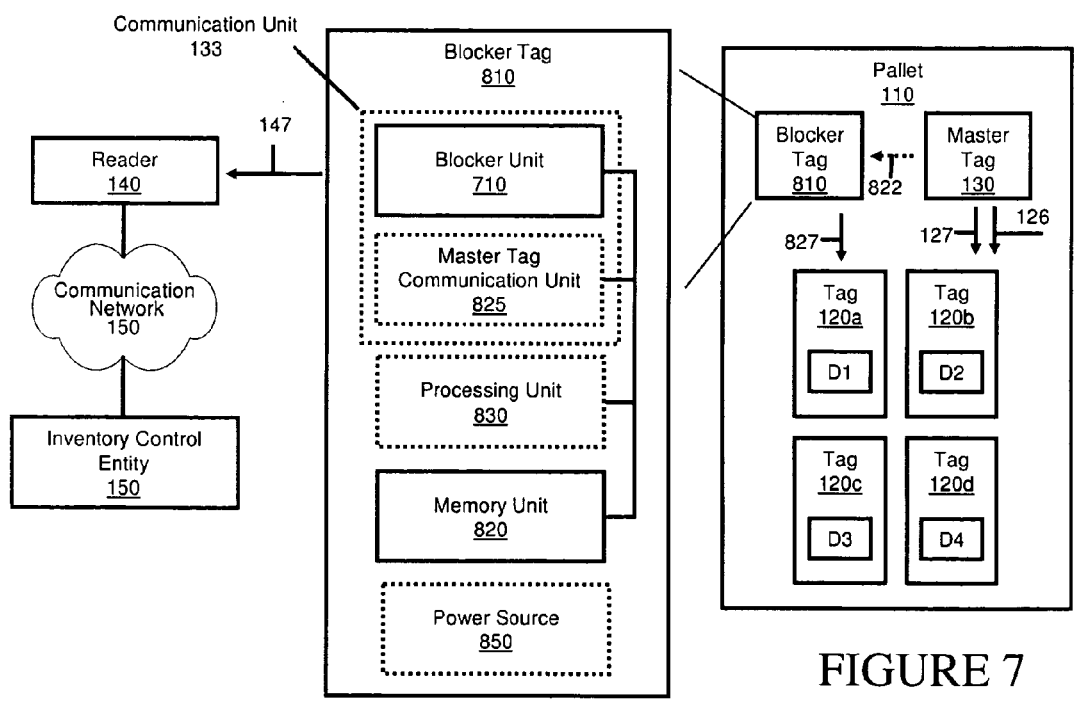
FIG. 7 depicts a system for wireless management of articles according to another alternative non-limiting embodiment of the present invention.

FIG. 7 depicts another non-limiting embodiment of the present invention, in which a blocker tag 810 is further attached to the pallet 110, in a manner similar to that described above with reference to the master tag 130. FIG. 7 is substantially similar to FIG. 2, with like components represented by like numbers. The blocker tag 810 may incorporate all of the functionality described with respect to the blocker unit 610 described above. In some embodiments, the blocker tag 810 may be configured to prevent tags with a given prefix from being read. In these embodiments, the blocker tag 810 may comprise a blocker unit 710 similar to blocker unit 610 of FIG. 5 and a memory unit 820 for storing the given prefix and associated blocking data.

In some non-limiting embodiments, the master tag 130 of FIG. 2 may be configured to transmit a tag specific key which sets the prefix of all read tags to the given prefix, similar to the example described above, via the blocking signal 127.

In other embodiments, this functionality may reside at the blocker tag 810, with the master tag 130 being further configured to communicate the identifiers D1, D2, D3, D4 of inventory management tags 120a, 120b, 120c, 120d whose data has been retrieved by the master tag 130 to the blocker tag 810. Within these non-limiting embodiments, the blocker tag 810 comprises a master tag communication unit 825 for communicating with the master tag 130. The master tag communication unit 825 can be similar to the tag communication unit 132 and/or the reader communication unit 134 described above, and is configured to receive a signal 822 which comprises the identifiers D1, D2, D3, D4, of the plurality of inventory management tags 120a, 120b, 120c, 120d, which have been retrieved by the master tag 130. The tag communication unit 132 or the reader communication unit 134 at the master tag 130 may be configured to transmit the identifiers of inventory management tags 120a, 120b, 120c, 120d which are stored in the memory unit 138 via the signal 822. In these non-limiting embodiments, the blocker unit 710 is configured to transmit a tag specific key which sets the prefix of all read tags to the given prefix, similar to the example described above. The tag specific key may be transmitted via a blocking signal 827 transmitted by the blocker unit 710. In these non-limiting embodiments, the memory unit 820 is further configured for storing identifiers D1, D2, D3, D4 that are received from the master tag 130. As depicted in FIG. 7, the blocker tag 810 further comprises a processing unit 830 similar to the processing unit 136 described above, for processing data received from the master tag 130, and for managing data stored at the memory unit 820.

In embodiments where the blocker tag 810 is configured to block specific ranges of identifiers D1, D2, D3, D4, the processing unit 830 may be configured to identify prefixes that the identifiers D1, D2, D3, D4 have in common, for example at the serial number level. The processing unit 830 may then be further configured to trigger the blocker unit 710 to block the reader 140 from reading those ranges of identifiers by transmitting the blocking signal 147.

Similar to the description for FIG. 6, although described above with a prefix identifying read and unread tags, it should be understood that many other options are possible. For instance, other bits could be modified within or outside of the identifiers (such as the EPC) to indicate that a tag has been read or unread. Further, in other non-limiting embodiments, a separate flag bit could be maintained on the tags to manage the indication of whether they have been read or not, this flag being changed by the master tag 130 or the blocker tag 810.

Similar to the combined communication unit 133 of FIG. 2 and the combined communication unit 133' of FIG. 5, the blocker unit 710 and the master tag communication unit 825 may be combined into combined communication unit 860, as indicated by the dotted outline in FIG. 7. Similar to the power source 139 described above with reference to FIG. 2, the blocker tag 810 may have a power source 850.

Figure 8:
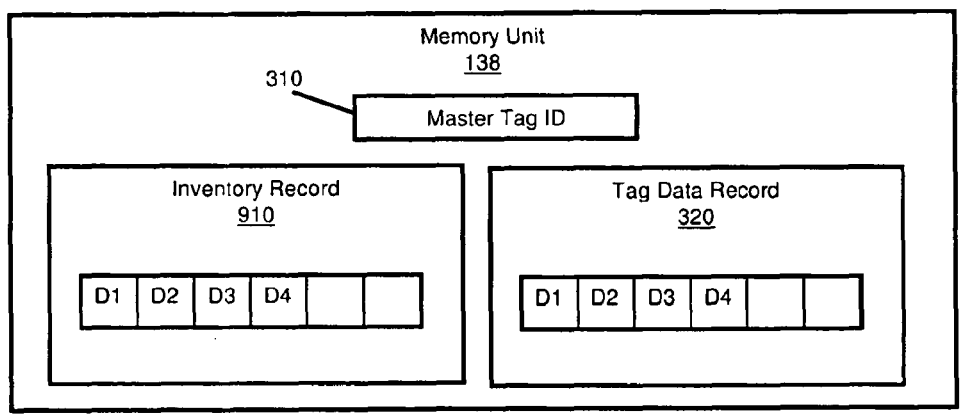
FIGS. 8, 9 and 10 depict further non-limiting examples of a memory unit of a master tag.

FIG. 8 depicts another non-limiting example of the memory unit 138 depicted in FIG. 3, with like components depicted with like numbers. Within FIG. 8, the memory unit 138 further comprises an inventory record 910, which contains a plurality of fields for storing identifiers of goods loaded onto the pallet 110. In general, the number of fields is not particularly limited, except by the size of the memory. Although the record 910 is shown with six fields, more or fewer fields are within the scope of the invention. In one non-limiting embodiment, the inventory record 910 comprises at least a portion of an Advance Shipment Notice (ASN), which may identify purchase order numbers, stock keeping unit (SKU) numbers, similar to the serial number of an item of a product, lot numbers, quantity, pallet or container number, and/or carton number. In one non-limiting embodiment, the inventory record 910 comprises a list of identifiers D1, D2, D3, D4 associated with the plurality of inventory management tags 120a, 120b, 120c, 120d, these identifiers D1, D2, D3, D4 representing the goods that are present on the pallet 110 of FIG. 2 or FIG. 7. The inventory record 910 may be populated in a prior provisioning step, for example at the time of loading the pallet 110 with the goods.

Within the example depicted in FIG. 8, the inventory record 910 comprises identifiers D1, D2, D3, D4, and the tag data record 320 comprises identifiers D1, D2, D3, D4. Hence, within this example, all of the plurality of inventory management tags 120a, 120b, 120c, 120d attached to the goods that were loaded onto the pallet 110 and recorded within the inventory record 910 were read by the master tag 130.

Figure 9:
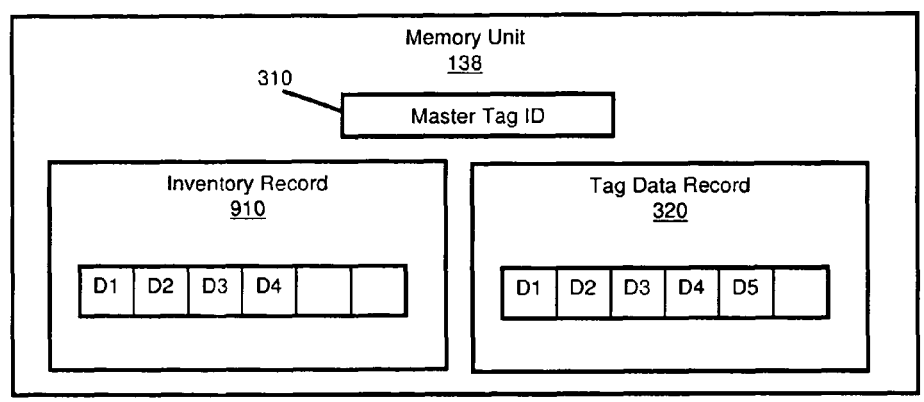

FIG. 9 depicts another non-limiting example of the memory unit 138 depicted in FIG. 8, with like components depicted with like numbers. Within this non-limiting example, the inventory record 910 comprises identifiers D1, D2, D3, D4 and the tag data record 320 comprises identifiers D1, D2, D3, D4, D5. Hence, within this example, the tag data record 320 indicates that an inventory management tag comprising the identifier D5 was read by the master tag 130. However, as the identifier D5 is not present in the inventory record 910, there is a discrepancy in the accounting of the inventory. In some embodiments, this may indicate that a mistake was made during the loading process and that an extra item was loaded onto the pallet 110. In other embodiments, this may indicate that a mistake was made in provisioning the inventory record 910. In yet other embodiments, this may indicate that the item having the identifier D5 may be in the proximity of the master tag 130, but may not actually be loaded onto the pallet 110. This last situation may occur in situations where a shipment of goods comprises a plurality of pallets, each potentially having a separate master tag similar to the master tag 130 attached to each pallet (for example see FIG. 13).

Figure 10:
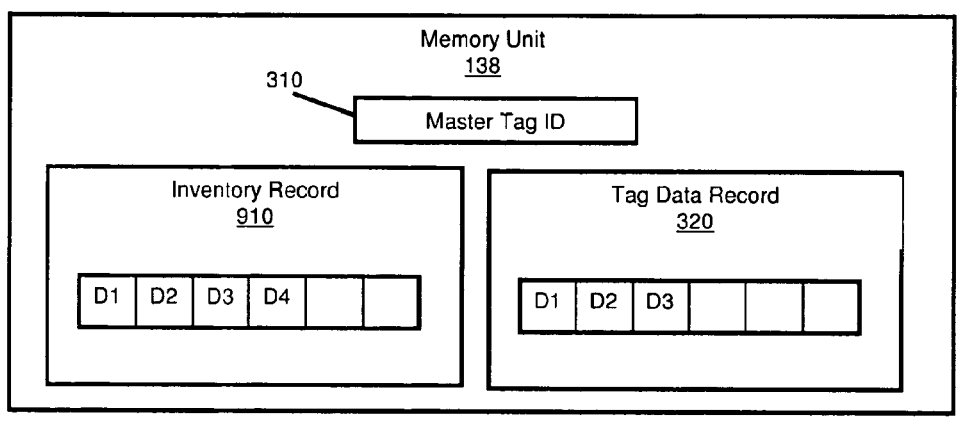

FIG. 10 depicts yet another non-limiting example of the memory unit 138 depicted in FIG. 8, with like components depicted with like numbers. Within this embodiment, the inventory record 910 comprises identifiers D1, D2, D3, D4, and the tag data record 320 comprises identifiers D1, D2, D3. Hence, within this example, the tag data record 320 indicates that the inventory management tag comprising the identifier D4 was not read by the master tag 130. However, as the identifier D4 is present in the inventory record 910, there is a discrepancy in the accounting of the inventory. This may indicate that a mistake was made during the loading process and that either an item was not loaded onto the pallet 110, or a mistake was made in provisioning the inventory record 910. However, the tag data record 320 and the inventory record 910 may also indicate that if the item with the identifier D4 is present on the pallet 110, the inventory management tag which is attached to the item may not be readable by the master tag 130.

Figure 11:
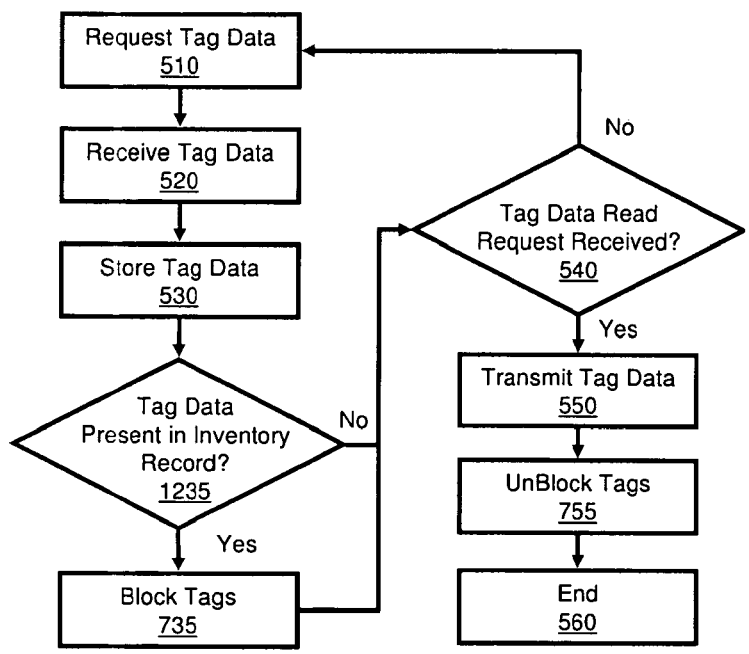
FIGS. 11 and 12 depict flow charts of steps performed by a master tag according to further alternative non-limiting embodiments of the present invention.

One embodiment of the present invention which includes a master tag 130 that comprises the inventory record 910 will now be described with reference to FIG. 11, which depicts a method for wireless inventory management. In order to assist in the explanation of the method, it will be assumed that the method of FIG. 11 is operated using the system depicted in FIG. 5. The method depicted in FIG. 11 is substantially similar to the method depicted in FIG. 6, with like steps represented by like numbers. However, the method depicted in FIG. 11 further comprises a step 1235 in which the master tag 130 determines if the inventory management tag data received at step 520 is present in the inventory record 910. In a non-limiting embodiment, the step 1235 is executable within the processing unit 136. In alternative embodiments, the step 1235 could be performed prior to the storing of the tag data at step 530.

As depicted in FIG. 11, if the processing unit 136 determines that the inventory tag data received is present in the inventory record 910, the master tag 130 proceeds to block the one or more of the plurality of inventory management tags 120a, 120b, 120c, 120d that were read from communicating with the reader 140 and, in some embodiments, from responding to further requests for data from the master tag 130, in the manner described above. If all the inventory management tag data retrieved is present in the inventory record 910, for example in the embodiment depicted in FIG. 8, than all of the plurality of inventory management tags 120a, 120b, 120c, 120d are blocked from communicating with the reader 140 and, in some embodiments, with the tag communication unit 132.

If it is determined at step 1235 that the inventory management tag data received at step 520 is not present in the inventory record 910, the inventory management tag(s) that comprise identifiers which were read are not blocked from communicating with the reader 140, the master tag 130 or other master tags (not depicted) that may be sufficiently close to read the inventory management tag(s). In this case, the inventory management tag(s) read may correspond to goods that are located on another pallet. Therefore, in many scenarios, it would not be desirable to block the inventory management tag. In these embodiments, further requests for inventory management tag data, at step 510, could result in further receipt of inventory management data from the unblocked inventory management tags.

In some circumstances, an unblocked inventory management tag may stop responding to the further requests for inventory management tag data. This situation may occur, for example, if the item to which the unblocked inventory management tag is attached is removed from the proximity of the master tag 130 or if another master tag blocks the inventory management tag from responding to further reads from the master tag 130. This blocking of the inventory management tag could occur if the other master tag had the identifier of the inventory management tag within its inventory record. With reference to the non-limiting example depicted in FIG. 9, if the inventory management tag having the identifier D5 is in the proximity of the master tag 130, but not actually present on the pallet 110, the inventory management tag having the identifier D5 may stop responding to further requests for inventory management tag data when it is removed from the proximity of the master tag 130 or blocked by a master tag associated with its pallet. In some non-limiting embodiments, the identifier of the inventory management tag may be deleted from the tag data record 320 if the tag stops responding to the further requests for inventory management tag data.

At step 550 within FIG. 11, the inventory management tag data present in the tag data record 320 can be transmitted as described previously. However, in some non-limiting embodiments, the contents of the inventory record 910 may also be transmitted, in a similar manner. The inventory management tag data present in the tag data record 320 and the contents of the inventory record 910 may be received at the reader 140, and transmitted to the inventory management entity 150. The inventory management entity 150 may be configured to sort and compare the inventory management tag data present in the tag data record 320 and the contents of the inventory record 910, for billing and/or inventory purposes, as well as other inventory management purposes listed above.

In other non-limiting embodiments, the inventory management tag data present in the tag data record 320 may be transmitted at step 550, along with additional data which indicates the status of the identifier D1, D2, D3, D4, in relation to the inventory record 910. For instance, the master tag 130 may transmit the contents of the tag data record 320, along with an indicator as to whether or not an identifier present in the tag data record 320 is present or absent in the inventory record 910. In a non-limiting example, with reference to the embodiment depicted in FIG. 9, the identifier D5 would be transmitted with an identifier indicating that it is absent from the inventory record 910, while the identifiers D1, D2, D3, D4 would be transmitted with an identifier indicating they are present in the inventory record 910.

In yet other non-limiting embodiments, the contents of the tag data record 320 may be transmitted at step 550, along with the identifiers present in the inventory record 910 that are not present in the tag data record 320. In these non-limiting embodiments, the identifiers present in the inventory record 910, that are not present in the tag data record 320 may be transmitted along with an indicator of this status. For instance, with reference to the non-limiting example depicted in FIG. 10, the identifier D4 would be transmitted with an identifier indicating that it is absent from the tag data record 320. The inventory management entity 150 may be configured to process this information for inventory accounting purposes, as well as other inventory management purposes listed above. For example, billing for the goods on the pallet could proceed, excluding the goods associated with the identifier D4, which is absent from the tag data record 320, Further, the inventory management entity 150 may be able to locate the inventory management tag with the identifier D4 on another pallet.

In yet other non-limiting embodiments, a copy of the inventory record 910 may be accessible to the inventory management entity 150 at a database (not depicted) which links master tag identifiers, such as the master tag identifier stored at record 310, with copies of inventory records, such as the inventory record 910. In these non-limiting embodiments, the processing unit 136 may compare the inventory record 910 with the tag data record 320. Based on this comparison, at step 550, the master tag 130 may transmit the master tag identifier within the record 310 along with any "missing" identifiers that are present in the inventory record 910 but that are not present in the tag data record 320 (e.g. FIG. 10) and/or any "extra" identifiers that are present in the tag data record 320 but that are not present in the inventory record 910 (e.g. FIG. 9). In some embodiments, additional indicators may be sent to indicate the status of each identifier, as described above. In some non-limiting examples such as FIG. 8, all of the identifiers which are present in the inventory record 910 may be present in the tag data record 320, and vice versa. In these embodiments, the master tag 130 may transmit only the master tag identifier, thus indicating that all inventory is accounted for. Alternatively, the master tag 130 may transmit the master tag identifier and an indicator indicating that all expected inventory is present, and further no additional inventory is present.

Hence, in these non-limiting embodiments in which the processing unit 136 compares the inventory record 910 to the tag data record 320, not all of the read identifiers need to be transmitted to the reader 140 and the content of the master tag response signal 144 may be reduced. This can reduce the time required for the reader to receive the master response signal 144 significantly.

In these non-limiting embodiments, the inventory management entity 150 is configured to receive the data indicating the presence of additional inventory or the absence of expected inventory, along with the master tag identifier. The inventory management entity 150 can then utilize the master tag identifier to look-up the corresponding inventory record 910 and compare the received information to the inventory record 910, for billing and/or inventory purposes, as well as other inventory management purposes listed above.

In some non-limiting embodiments, the master tag 130 may be configured to exchange tag data stored in the memory unit 138 with other master tags, for example master tags attached to adjacent pallets, in order to obtain a more complete accounting of inventory. These embodiments will be described below with reference to FIGS. 13 to 15.

Figure 12:
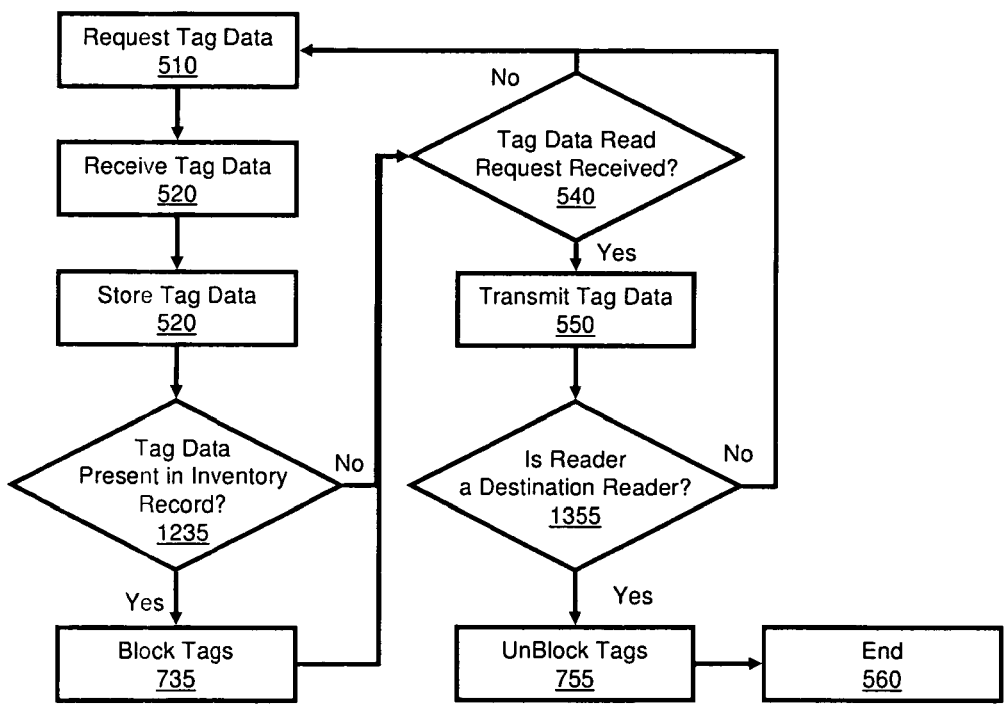

A method for wireless inventory management according to non-limiting embodiments of the present invention is now described with reference to FIG. 12. In order to assist in the explanation of the method, it will be assumed that the method of FIG. 12 is operated using the system depicted in FIG. 5. The method depicted in FIG. 12 is substantially similar to the method depicted in FIG. 11, with like steps represented by like numbers. However, the method depicted in FIG. 12 further comprises a step 1355 in which the master tag 130 is configured to determine if the reader 140 from which an inventory tag data request has been received, at step 540, is a destination reader. In a non-limiting embodiment, the step 1355 is executable within the processing unit 136.

In some non-limiting embodiments, as the pallet 110 is shipped from one location to another location, the master tag 130 may enter into the proximity of more than one reader 140. In a non-limiting example, a shipment of goods may be loaded onto a pallet 110 at a warehouse. The pallet 110 may be loaded onto a transport vehicle, and transported to a central inventory warehouse. If an order is placed by a customer, the pallet 110 may then be shipped via another transport vehicle to a customer warehouse for storage. The customer may yet further ship the pallet 110, via yet another transport vehicle to a customer store, where the shipment is unloaded from the pallet 110. In this example, a reader 140, or a plurality of readers 140, may be present at each warehouse, on each of the transport vehicles and at the customer store. It may be desirable to continue to block the tags attached to the goods in the shipment, until the pallet 110 has reached its destination.

Hence, at step 1355, the processing unit 136 determines if the reader 140 from which the tag data read request has been received, is a reader located at a final destination. This determination may comprise receiving an indicator from the reader 140 as to whether it is the destination reader. In some embodiments, this indicator may be present in the read signal 143 received at the master tag 130. However, in other embodiments, this indicator may also be transmitted to the master tag 130 via a destination signal 610 transmitted by the reader 140. In these non-limiting embodiments, the reader 140 is configured to transmit the destination signal 610. In alternative non-limiting embodiments, the master tag 130 may store a destination reader identifier within the memory unit 138. In this case, the processing unit 136 may be configured to determine if the reader 140 is the reader located at the final destination by comparing a reader identifier received from the reader 140 with the stored destination reader identifier.

If the processing unit 136 determines the reader 140 is a destination reader, the tags are unblocked at step 755, as described above. However, if the processing unit 136 determines the reader 140 is not a destination reader, the master tag does not unblock the inventory management tags and may continue to request tag data at step 510.

Returning to FIG. 2, and with reference to FIGS. 8, 9 and 10, in some embodiments of the present invention where the inventory management tags may not be blocked, the memory unit 138 of the master tag 130 may also include an inventory record 910, as described above. Hence, by processing the data stored at the tag data record 320 and the inventory record 910, the processing unit 136 may determine identifiers of the plurality of inventory management tags 120a, 120b, 120c, 120d which are present in one record but not the other. As described above, in these non-limiting embodiments, the master response signal 143 may comprise only the identifiers of the plurality of inventory management tags 120a, 120b, 120c, 120d which are present in one record but not the other (i.e. the missing and/or extra identifiers).

Figure 13:
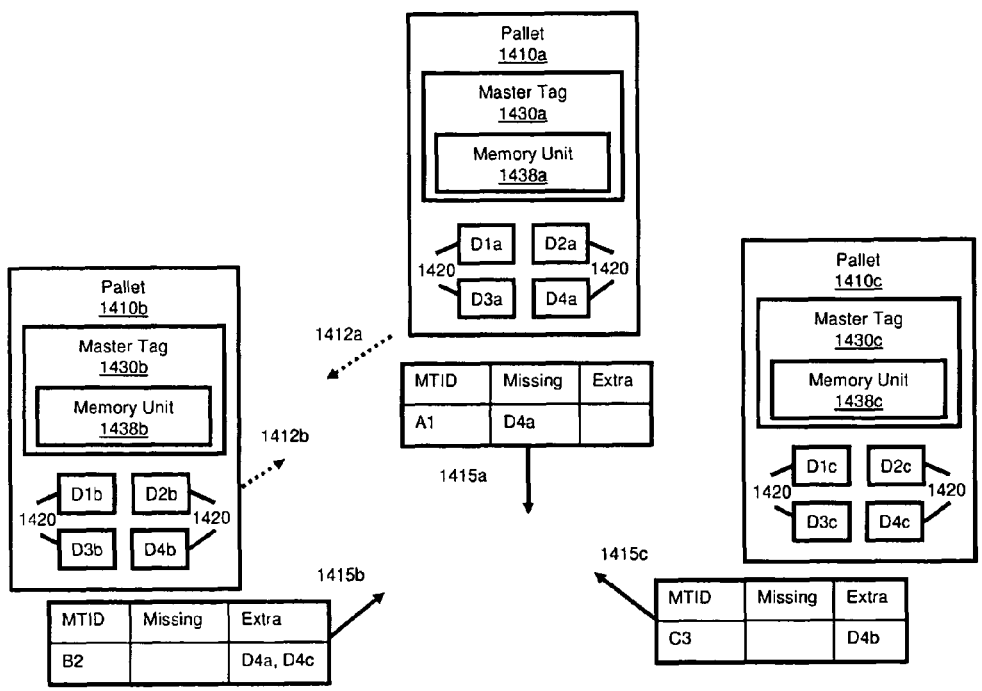
FIG. 13 depicts a plurality of master tags, each coupled to a respective pallet, according to a non-limiting example of the present invention.

Turning now to FIG. 13, in some embodiments of the present invention, a shipment of goods may be loaded onto a plurality of pallets 1410a, 1410b, 1410c, each similar to the pallet 110 of FIG. 1. The plurality of pallets 1410a, 1410b, 1410c may be shipped together in a container (not depicted) to a destination.

Within these embodiments, a respective master tag 1430a, 1430b, 1430c is attached to each of the plurality of pallets 1410a, 1410b, 1410c, respectively in a similar manner to the attachment of the master tag 130 to pallet 110, as described above. Each of the plurality of pallets 1410a, 1410b, 1410c will further comprise a plurality of inventory management tags 1420, similar to the plurality of inventory management tags 120a, 120b, 120c, 120d, described above, each of the inventory management tags 1420 is attached to goods loaded onto each of the plurality of pallets 1410a, 1410b, 1410c.

Each of the inventory management tags 1420 comprise an identifier associated with the item to which the inventory management tag 1420 is attached, as described above. In the example depicted in FIG. 13, the pallet 1410a comprises inventory management tags 1420 with identifiers D1a, D2a, D3a, D4a. The pallet 1410b comprises inventory management tags 1420 with identifiers D1b, D2b, D3b, D4b. The pallet 1410c comprises inventory management tags 1420 with identifiers D1c, D2c, D3c, D4c.

Within the example depicted in FIG. 13, the plurality of pallets 1410a, 1410b, 1410c are depicted as being adjacent to one another; however, the arrangement of the plurality of pallets 1410a, 1410b, 1410c is not particularly limited. For example, the plurality of pallets 1410a, 1410b, 1410c may be stacked, arranged side by side, etc.

Each of the master tags 1430a, 1430b, 1430c may be similar to embodiments of the master tag 130 described with reference to the FIG. 1, 2, 5, or 7. Hence, each master tag 1430a, 1430b, 1430c comprises the tag communication unit 132, the reader communication unit 134, or in some embodiments the communication unit 133, the processing unit 136, and the power source 139, of the master tag 130, with functionality as described above. In some non-limiting embodiments, each of the master tags 1430a, 1430b, 1430c may further comprise the blocker unit 610, with functionality as described above. In some other non-limiting embodiments, each of the pallets 1410a, 1410b, 1410c may further comprise the blocker tag 810, with functionality as described above.

Figure 14:
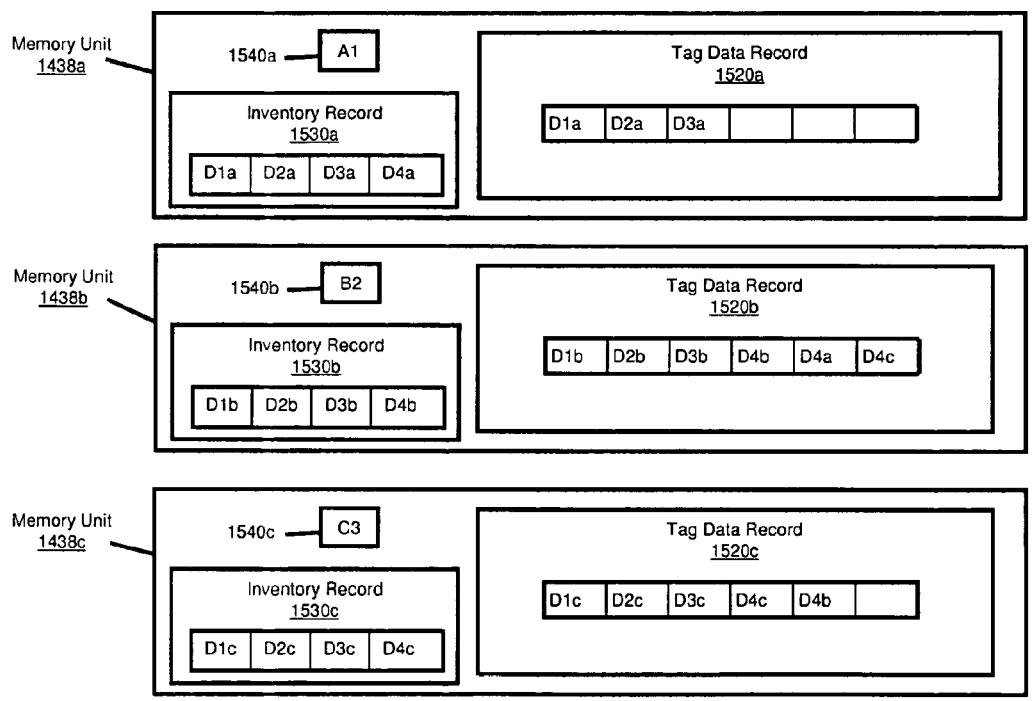
FIGS. 14 and 15 depict non-limiting examples of the memory units corresponding to the master tags of FIG. 13.

Each of the master tags 1430a, 1430b, 1430c further comprises a memory unit 1438a, 1438b, 1438c, respectively, for which non-limiting examples are depicted in FIG. 14. Within the non-limiting examples depicted in FIG. 14, each memory unit 1438a, 1438b, 1438c comprises a respective tag data record 1520a, 1520b, 1520c, a respective inventory record 1530a, 1530b, 1530c, and a respective master tag ID record 1540a, 1540b, 1540c, similar to the tag data record 320, the inventory record 910, and the master tag ID record 310 of the memory unit 138 depicted in FIG. 8.

The master tag ID records 1540a, 1540b, 1540c comprise a field for storing an identifier of each master tag 1430a, 1430b, 1430c. In the example depicted, the identifiers of each master tag 1430a, 1430b, 1430c comprise identifiers A1, B2 and C3, respectively.

The tag data records 1520a, 1520b, 1520c comprise a plurality of fields for storing inventory management tag identifiers which have been retrieved from inventory management tags 1420, in a manner similar to that described above.

The inventory records 1530a, 1530b, 1530c comprise a plurality of fields for storing the inventory management tag identifiers which are expected to be present on each pallet 1410a, 1410b, 1410c. The inventory records 1530a, 1530b, 1530c may be provisioned in a manner similar to the provisioning of inventory record 910, described above.

As depicted in the non-limiting examples of FIG. 14, there are discrepancies between the tag data records 1520a, 1520b, 1520c and the inventory records 1530a, 1530b, 1530c of each memory unit 1438a, 1438b, 1438c. These discrepancies may be due to the configuration of each master tag 1430a, 1430b, 1430c and/or the configuration of the goods on each pallet 1410a, 1410b, 1410c. In any event, the master tag 1430a, 1430b, 1430c may be unable to retrieve data from certain inventory management tags attached to the goods.

In some non-limiting embodiments, these discrepancies may be resolved once the data present on the memory units 1438a, 1438b, 1438c of each of the master tags 1430a, 1430b, 1430c is retrieved by the reader 140, and received by the inventory management entity 150 of FIG. 1. Either the inventory management entity 150 or the reader 140 could consolidate the information to properly analyse the inventory on the pallets 1410a, 1410b, 1410b, 1410c. In other non-limiting embodiments, resolution of all discrepancies at the inventory management unit 150 and/or the reader 140 may not be possible and/or desirable. In some instances, the pallets 1410a, 1410b, 1410c may be separated and shipped to different locations once the shipment has reached an intermediate destination and a reader (similar to the reader 140) may not be present at the intermediate destination that is capable to retrieve the data and resolve the discrepancies. In this case, the data from each master tag 1430a, 1430b, 1430c may be processed by different inventory management entities, each belonging to different organizations, or processed for different accounts within a single inventory management entity. The discrepancies may then lead to an incorrect assessment of inventory, and errors in billing. In other instances, the inventory management entity and/or the readers may not have the functionality to clear up the discrepancies in the accounting of inventory.

In order to resolve the discrepancies, in some non-limiting embodiments of the present invention, each of the master tags 1430a, 1430b, 1430c is further configured to communicate with at least one of of the other master tags 1430a, 1430b, 1430c, via the tag communication unit 132, the reader communication unit 134 or the communication unit 133. Specifically, each master tag 1430a, 1430b, 1430c is configured to transmit inventory management tag data or processed versions of the inventory management tag data to at least one other of the master tags 1430a, 1430b, 1430c.

In one non-limiting embodiment, as depicted in FIG. 13, each of the master tags 1430a, 1430b, 1430c is configured to transmit a signal 1415a, 1415b, 1415c, respectively. Each of the signals 1415a, 1415b, 1415c comprise inventory management tag data derived from at least the tag data records 1520a, 1520b, 1520c within the memory units 1438a, 1438b, 1438c, respectively. In some embodiments, each of the signals 1415a, 1415b, 1415c may be transmitted to all of the master tags 1430a, 1430b, 1430c. In other embodiments, each of the signals 1415a, 1415b, 1415c may be transmitted to an adjacent master tag. In one non-limiting example, the master tag 1430a may transmit the signal 1415a which may be received only at master tag 1430b. In one non-limiting example, this may be achieved by limiting the strength of the signal 1430a, such that it is received only at the master tag 1430b. In other embodiments, the tag communication unit 132, the reader communication unit 134 and/or the communication unit 133 at the master tag 1430a may be configured to transmit the signal 1430a in the direction of the master tag 1430b.

In other non-limiting embodiments, each of the signals 1415a, 1415b, 1415c may be intended for a specific master tag. In these embodiments, each of the memory units 1438a, 1438b, 1438c may further comprise a record of the identifiers of the master tags 1430a, 1430b, 1430c in the shipment of goods. In these embodiments, each of the signals 1415a, 1415b, 1415c may further comprise the identifier of the master tag 1430a, 1430b, 1430c for which each of the signals 1415a, 1415b, 1415c is intended. In a non-limiting example, each of the master tags 1430b, 1430c may be configured to receive the signal 1415a, and process the signal 1415a only if the signal 1415a contains the identifier of the master tag 1430b or 1430c respectively. Transmission of the signals 1415b and 1415c may be configured in a similar manner.

In embodiments where the signals 1415a, 1415b, 1415c are transmitted to an adjacent master tag or the signals 1415a, 1415b, 1415c are intended for a specific master tag, the master tag which receives the signal may be further configured to extract the data within the signal 1415a, 1415b, 1415c and transmit the data to one or more other master tags. In a non-limiting example, the master tag 1430a may transmit the signal 1415a to the master tag 1430b. The master tag 1430b may extract the data from the signal 1415a and transmit the signal 1415b to the master tag 1430c. The signal 1415b may comprise the data extracted from the signal 1415a and data contained in the memory unit 1438b. In this manner, data may be passed from master tag to master tag without the signals 1415a, 1415b, 1415c being available to all of the master tags 1430a, 1430b, 1430c.

In some non-limiting embodiments, the signals 1415a, 1415b, 1415c may comprise inventory data derived from the tag data records 1520a, 1520b, 1520c and the inventory records 1530a, 1530b, 1530c, within the memory units 1438a, 1438b, 1438c, respectively. In the non-limiting example depicted in FIG. 13, each signal 1415a, 1415b, 1415c comprises the identifiers of inventory management tags which are present in one record (for example, the tag data records 1520a, 1520b, 1520c) but not the other record (for example, the inventory records 1530a, 1530b, 1530c) and vice versa. Furthermore, each identifier is further classified either as being "Missing" from the tag data record 1520a, 1520b, 1520c, but present in the respective inventory record 1530a, 1530b, 1530c, or as being "Extra", indicating that the identifier is present in the tag data record 1520a, 1520b, 1520c, but not present in the respective inventory record 1530a, 1530b, 1530c. In the non-limiting example of FIG. 13, each of the signals 1415a, 1415b, 1415c further comprise the master tag identifier as recorded in the master tag ID records 1540a, 1540b, 1540c. A classification of "Missing" may indicate that the inventory management tag associated with the "Missing" identifier was not readable by the master tag attached to the pallet where the inventory management tag is located. A classification of "Extra" may indicate that an inventory management tag located on an adjacent pallet was read by the master management tag.

Within the example depicted in FIG. 13, the signal 1415a comprises the master tag identifier A1 corresponding to the master tag 1410a and the identifier D4a which is "missing" from the tag data record 1520a, but present in the inventory record 1530a of the memory unit 1438a. Similarly, the signal 1415b comprises the master tag identifier B2 corresponding to the master tag 1410b and the identifier D4a and D4c which are "extra", indicating they are present in the tag data record 1520b, but not in the inventory record 1530b of the memory unit 1438b. And similarly, the signal 1415c comprises the master tag identifier C3 corresponding to the master tag 1410c and the identifier D4b which is present in the tag data record 1520c, but not in the inventory record 1530c of the memory unit 1438c.

Each of the signals 1410a, 1410b, 1410c may be received at each of the master tags 1430a, 1430b, 1430c, where they are processed by the respective processing units 136. In one non-limiting example, the signal 1415b is received at the master tag 1430a, where the processing unit 136 compares the contents of the signal 1415b to the contents of the inventory record 1530a and/or the tag data record 1520a of the memory unit 1438a. The processing unit 136 is configured to recognize that of the "extra" identifiers present in the signal 1415b, the identifier D4a is present in the inventory record 1530a of the memory unit 1438a. The tag data record 1520a of the memory unit 1438a is then updated to reflect the presence of the inventory management tag associated with the identifier D4a. Within the tag data record 1520a, in some non-limiting embodiments, the identifier D4a may be highlighted/flagged as a secondary read, i.e. a read from another master tag, rather than as a direct read, i.e. read by the master tag 1430a. The inventory management entity 150 may treat secondary read results differently for some purposes, for example inventory accounting and/or billing purposes, as well as other inventory management purposes listed above.

In order to eliminate a double counting of the identifier D4a, in some embodiments, the processing unit 136 at the master tag 1430b may delete the identifier D4a from the tag data record 1520b at the memory unit 1438b once the signal 1415b has been transmitted. In other non-limiting embodiments, the master tag 1430a may transmit a signal 1412a configured to indicate to the master tag 1430b that the identifier D4a has been received. In response to receiving the signal 1412a, the processing unit 136 at the master tag 1430b may delete the identifier D4a from the tag data record 1520b at the memory unit 1438b.

In yet other embodiments, the identifier D4a is not deleted from the tag data record 1520b at the memory unit 1438b, and the discrepancy is managed by the inventory management entity 150 of FIG. 1, once the tag data has been retrieved from the master tags 1430a and 1430b by the reader 140.

In another non-limiting example, the signal 1415b may be received at the master tag 1430c, where the processing unit 136 of the master tag 1430c compares the contents of the signal 1415b to the contents of the inventory record 1530c and/or the tag data record 1520c of the memory unit 1438c. The processing unit 136 is configured to recognize that, of the "extra" identifiers present in the signal 1415b, the identifier D4c, is present in the inventory record 1530c of the memory unit 1438c. As the identifier D4c is already present in the tag data record 1420c of the memory unit 1438c, in one non-limiting embodiment, no action is taken.

In yet another non-limiting example, the signal 1415a may be received at the master tag 1430b, where the processing unit 136 of the master tag 1430b compares the contents of the signal 1415*a* to the contents of the inventory record 1530*b* and/or the tag data record 1520*b* of the memory unit 1438*b*. The processing unit 136 is configured to recognize that the "missing" identifier D4*a* present in the signal 1415*a* is present in the tag data record 1520*b* of the memory unit 1438*b*. Within this embodiment, the master tag 1430*b* may be configured to transmit a signal 1412*b* configured to indicate to the master tag 1430*a* that the identifier D4*a* is present in the tag data record 1520*b* of the memory unit 1438*b*. Within this example, the accounting for the identifier D4*a* in the tag data record 1520*a* of the memory unit 1438*a* can be completed as described above.

In yet another non-limiting example, the signal 1415*c* may be received at the master tag 1430*b*, where the processing unit 136 of the master tag 1430*b* compares the contents of the signal 1415*c* to the contents of the inventory record 1530*b* and/or the tag data record 1520*b* of the memory unit 1438*b*. The processing unit 136 is configured to recognize that the "extra" identifier D4*b* present in the signal 1415*c*, is also present in the inventory record 1530*b* of the memory unit 1438*b*. However, this is similar to the example described above with reference to the identifier D4*c* and can be addressed in a similar manner.

In another non-limiting example, the signal 1415*c* is received at the master tag 1430*a*, where the processing unit 136 of the master tag 1430*a* compares the contents of the signal 1415*c* to the contents of the inventory record 1530*a* and/or the tag data record 1520*a* of the memory unit 1438*a*. The processing unit 136 is configured to recognize that the "extra" identifier D4*b* present in the signal 1415*c*, is not present in the inventory record 1530*a* of the memory unit 1438*a*, and no action is taken.

In another non-limiting example, the signal 1415*a* is received at the master tag 1430*c* where the processing unit 136 of the master tag 1430*c* compares the contents of the signal 1415*a* to the contents of the inventory record 1530*c* and/or the tag data record 1520*c* of the memory unit 1438*c*. The processing unit 136 is configured to recognize that the "missing" identifier D4*a* present in the signal 1415*a*, is not present in the tag data record 1520*c* of the memory unit 1438*c*, and no action is taken.

Figure 15:
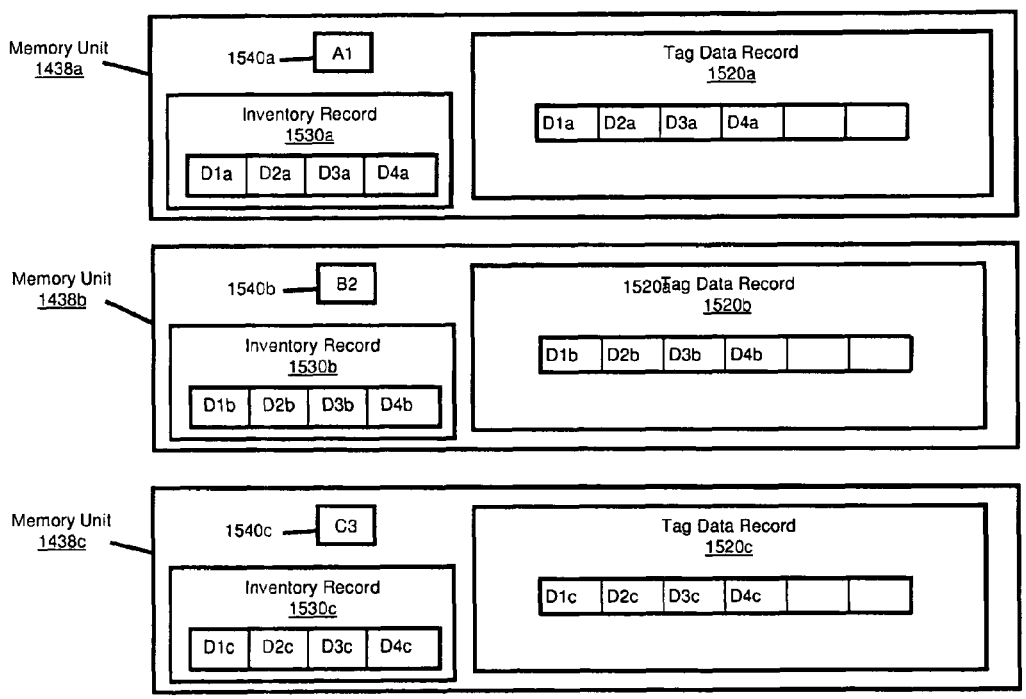

FIG. 15 depicts further non-limiting examples of the memory units 1438*a*, 1438*b*, 1438*c* of FIG. 14 once the various exchanges of signals are completed. As described above, after the exchange of signals are complete, "missing" identifiers may have been located by another master tag and "extra" identifiers may have been deleted. In other embodiments, the "extra" identifiers remain within their respective tag data records and the "missing" identifiers that have been located by a secondary master tag, may be flagged to this effect as described above.

There are many alternatives for the signals 1415*a*, 1415*b*, 1415*c* contemplated. In some non-limiting embodiments, the signals 1415*a*, 1415*b*, 1415*c* comprise the full contents of the tag data records 1520*a*, 1520*b*, 1520*c* present at each of the master tags 1430*a*, 1430*b*, 1430*c*, respectively. In this case, the processing unit 136 of each of the master tags 1430*a*, 1430*b*, 1430*c* that receives the signals 1415*a*, 1415*b*, 1415*c* is configured to filter through the contents to identify if any "missing" identifiers from their inventory records can be located. In other non-limiting embodiments, the signals 1415*a*, 1415*b*, 1415*c* comprise the full contents of the tag data records 1520*a*, 1520*b*, 1520*c*, respectively and the inventory records 1530*a*, 1530*b*, 1530*c*, respectively. In these embodiments, the processing unit 136 of each of the master tags 1430*a*, 1430*b*, 1430*c* is configured to compare the data received and update their respective tag data record 1520*a*, 1520*b*, 1520*c* as described above. Further, the processing unit 136 in this case may transmit a return signal, such as signal 1412*b* described above, to the master tag that transmitted the signal 1415*a*, 1415*b*, 1415*c* if there is an identifier within the received inventory record that matches an identifier within the tag data record stored in its memory unit. The master tag that transmitted the signal 1415*a*, 1415*b*, 1415*c* may or may not have already read the inventory management tag identifier and therefore, it may or may not actually be "missing". In other non-limiting embodiments, the signals 1415*a*, 1415*b*, 11415*c* comprise the full contents of the inventory records 1530*a*, 1530*b*, 1530*c* respectively. In these embodiments, the processing unit of each of the master tags 1430*a*, 1430*b*, 1430*c* is configured to compare the data received and determine if any identifiers match identifiers within their respective tag data records 1520*a*, 1520*b*, 1520*c*. As a result of this comparison, the processing unit 136 can transmit a signal similar to signal 1412*b* described above indicating which identifiers that are on another master tag that it had read. In yet further non-limiting embodiments, the signals 1415*a*, 1415*b*, 1415*c* could comprise only the "missing" identifiers or only the "extra" identifiers. Further, in some cases described above, the signals 1415*a*, 1415*b*, 1415*c* may not require the master tag identifier to be transmitted.

In some non-limiting embodiments, the tag data records 1520*a*, 1520*b*, 1520*c* and/or the inventory records 1530*a*, 1530*b*, 1530*c* of each of the master tags 1430*a*, 1430*b*, 1430*c*, may be further stored at the memory units 1438*a*, 1438*b*, 1438*c* of the other master tags 1430*a*, 1430*b*, 1430*c*. In this manner, data retrieved by the reader 140 from any of the master tags 1430*a*, 1430*b*, 1430*c* in the shipment of goods may convey the complete inventory of the shipment.

Although the transmissions between the master tags 1430*a*, 1430*b*, 1430*c* were described as proceeding directly, in alternative embodiments of the present invention, the signals 1415*a*, 1415*b*, 1415*c* could be transmitted between the other master tags 1430*a*, 1430*b*, 1430*c* via the reader 140. In this case, the reader 140 acts as a hub for communications between the master tags 1430*a*, 1430*b*, 1430*c*. This may be particularly applicable in cases where the master tags 1430*a*, 1430*b*, 1430*c* are unable to communicate with each other due to distance, attenuation, transmission power or communication standards.

Although the embodiments of the present invention described above with reference to FIGS. 1 to 15 are directed to inventory management within pallets, as discussed previously this should not limit the scope of the present invention. For instance, the transport object in which the embodiments of the master tag described above can be applied is not limited to pallets and could further apply to a shipping container, a truck trailer, a train car, a case, a storage container, a box, etc. Further, the embodiments of the master tags described above may be applied to non-transport objects such as goods that are located together such as in consumer displays, on shelves, in warehouses, in factories, in manufacturing facilities, on shop floors, or in storage rooms, etc. Yet further, the embodiments of the master tags described above may be applied to non-inventory articles, such as assets. In that case, the management system of the above described embodiments would relate to an asset management system. Based on the above discussion, it should be understood that the master tag 130 described in the present invention may apply as a master pallet tag, a master container tag, a master vehicle tag, a master trailer tag, a master case tag, a master box tag, a master shelf tag, a master display tag, a master factory tag, a master room tag, a master asset tag etc. Other applications for the master tag 130 may be contemplated by one of skill in the art after reading the description of the present invention.

Although described above as an inventory record, it should be understood that more generally the record can be considered an article record. In this case, the record may comprise identifiers associated with inventory elements and/or asset elements.

Those skilled in the art will appreciate that certain functionality of the master tag 130, the reader 140, inventory management entity 150 and/or other elements of the infrastructure described herein may be implemented as pre-programmed hardware or firmware elements (e.g., application specific integrated circuits (ASICs), electrically erasable programmable read-only memories (EEPROMs), etc.), or other related components. In other embodiments, certain portions of the master tag 130, the reader 140, the inventory management entity 150 and/or other elements may be implemented as an arithmetic and logic unit (ALU) having access to a code memory (not shown) which stores program instructions for the operation of the ALU. The program instructions could be stored on a medium which is fixed, tangible and readable directly by the master tag 130, the reader 140, the inventory management entity 150 and/or other elements, (e.g., removable diskette, CD-ROM, ROM, fixed disk, USB drive), or the program instructions could be stored remotely but transmittable to the master tag 130, the reader 140, the inventory management entity 150 and/or other elements via a modem or other interface device.

Persons skilled in the art will appreciate that there are yet more alternative implementations and modifications possible for implementing the present invention, and that the above implementations and examples are only illustrations of one or more embodiments of the present invention. The scope of the invention, therefore, is only to be limited by the claims appended hereto.

I claim:

1. A method implemented by a master RFID tag, the method comprising:
   transmitting at least one first RFID read signal to a plurality of RFID tags local to the master RFID tag;
   receiving a first RFID response signal from each of the plurality of RFID tags in response to the at least one first RFID read signal, each of the first RFID response signals comprising an identifier associated with an article;
   maintaining an article record indicating at least one expected article that is to be managed by the master RFID tag;
   identifying one or more extra articles by identifying a specific identifier received within the plurality of first RFID response signals that lacks a corresponding specific expected article within the article record; and
   transmitting a master signal comprising one or more identifiers of the extra articles.

2. A method defined in claim 1 further comprising identifying one or more missing articles by identifying a specific expected article within the article record that lacks a corresponding specific identifier received within the plurality of first RFID response signals, the master signal further comprising one or more identifiers of the missing articles.

3. A method defined in claim 1, wherein the transmitting a master signal comprises, responsive to receipt of a second RFID read signal from an RFID reader, transmitting a second RFID response signal, the second RFID response signal comprising the one or more identifiers of the extra articles.

4. A method defined in claim 1, the master RFID tag being a first master RFID tag, wherein the transmitting a master signal comprises transmitting a master signal comprising the one or more identifiers of the extra articles to a second master RFID tag.

5. A method defined in claim 4 further comprising maintaining a second article record within the second master RFID tag for indicating at least one expected article that is to be managed by the second master RFID tag; and receiving a request signal comprising at least one identifier from the second article record from the second master RFID tag; and wherein the transmitting a master signal is responsive to the request signal.

6. A method defined in claim 5, wherein the transmitting the master signal to the second master RFID tag occurs if the at least one identifier from the second article record within the request signal is one of the identifiers of the extra articles.

7. A method implemented by a master RFID tag, the method comprising:
   transmitting at least one first RFID read signal to a plurality of RFID tags local to the master RFID tag;
   receiving a first RFID response signal from each of the plurality of RFID tags in response to the at least one first RFID read signal, each of the first RFID response signals comprising an identifier associated with an article;
   maintaining an article record indicating at least one expected article that is to be managed by the master RFID tag;
   identifying one or more missing articles by identifying a specific expected article within the article record that lacks a corresponding specific identifier received within the plurality of first RFID response signals; and
   transmitting a master signal comprising one or more identifiers of the missing articles.

8. A method defined in claim 7, wherein the transmitting a master signal comprises, responsive to receipt of a second RFID read signal from an RFID reader, transmitting a second RFID response signal, the second RFID response signal comprising the one or more identifiers of the missing articles.

9. A method defined in claim 7, the master RFID tag being a first master RFID tag, wherein the transmitting a master signal comprises transmitting a master signal comprising the one or more identifiers of the missing articles to a second master RFID tag.

10. A method defined in claim 7, the master RFID tag being a first master RFID tag and the identifiers received within the first RFID response signals being a first set of identifiers; the method further comprising receiving data associated with a second set of identifiers from a second master RFID tag and comparing the second set of identifiers with the one or more identifiers of the missing articles.

11. A method defined in claim 10 further comprising transmitting a request signal comprising the one or more identifiers of the missing articles to the second master RFID tag prior to receiving data associated with a second set of identifiers from the second master RFID tag.

12. A master RFID tag comprising:
   a first communication unit operative for:
      transmitting at least one first RFID read signal to a plurality of RFID tags local to the master RFID tag; and
      receiving a first RFID response signal from each of the plurality of RFID tags in response to the at least one first RFID read signal, each of the first RFID response signals comprising an identifier associated with an article;
   a memory unit operative for storing an article record indicating at least one expected article that is to be managed by the master RFID tag;

a processing unit operative for at least one of: identifying one or more extra articles by identifying a specific identifier received within the plurality of first RFID response signals that lacks a corresponding specific expected article within the article record; and identifying one or more missing articles by identifying a specific expected article within the article record that lacks a corresponding specific identifier received within the plurality of first RFID response signals; and a second communication unit operative for transmitting a master signal comprising at least one of: one or more identifiers of the extra articles and one or more identifiers of the missing articles.

13. A master RFID tag defined in claim 12, wherein the processing unit is operative for identifying one or more extra articles and the master signal comprises one or more identifiers of the extra articles.

14. A master RFID tag defined in claim 12, wherein the processing unit is operative for identifying one or more missing articles and the master signal comprises one or more identifiers of the missing articles.

15. A master RFID tag defined in claim 12, wherein to transmit a master signal, the second communication unit is operative for, responsive to receipt of a second RFID read signal from an RFID reader, transmitting a second RFID response signal, the second RFID response signal comprising at least one of: the one or more identifiers of the extra articles and the one or more identifiers of the missing articles.

16. A master RFID tag defined in claim 12, the master RFID tag being a first master RFID tag, wherein to transmit a master signal, the second communication unit is operative for transmitting a master signal comprising at least one of: the one or more identifiers of the extra articles and the one or more identifiers of the missing articles to a second master RFID tag.

17. A master RFID tag defined in claim 16, wherein the second master RFID tag is operative for maintaining a second article record for indicating at least one expected article that is to be managed by the second master RFID tag; wherein the second communication unit is further operative for receiving a request signal comprising at least one identifier from the second article record from the second master RFID tag; and wherein the transmitting a master signal is responsive to the request signal.

18. A master RFID tag defined in claim 17, wherein the second communication unit is operative for transmitting the master signal to the second master RFID tag if the at least one identifier from the second article record within the request signal is one of the identifiers of the extra articles.

19. A master RFID tag defined in claim 12, the master RFID tag being a first master RFID tag and the identifiers received within the first RFID response signals being a first set of identifiers; wherein one of the first and second communication units is further operative for receiving data associated with a second set of identifiers from a second master RFID tag; and wherein the processing unit is further operative for comparing the second set of identifiers with the one or more identifiers of the missing articles.

20. A master RFID tag defined in claim 19, wherein the one of the first and second communication units is further operative for transmitting a request signal comprising the one or more identifiers of the missing articles to the second master RFID tag prior to receiving data associated with a second set of identifiers from the second master RFID tag.

* * * * *